(12) United States Patent
Chen et al.

(10) Patent No.: US 10,591,700 B2
(45) Date of Patent: Mar. 17, 2020

(54) IMAGING LENS, AND ELECTRONIC APPARATUS INCLUDING THE SAME

(71) Applicant: GENIUS ELECTRONIC OPTICAL CO., LTD., Taichung (TW)

(72) Inventors: Shih-Han Chen, Taichung (TW); Chung-Chih Chang, Taichung (TW); Yita Chiang, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 26 days.

(21) Appl. No.: 15/841,745

(22) Filed: Dec. 14, 2017

(65) Prior Publication Data

US 2018/0372994 A1 Dec. 27, 2018

Related U.S. Application Data

(63) Continuation of application No. 14/933,161, filed on Nov. 5, 2015, now Pat. No. 9,874,717, which is a
(Continued)

(30) Foreign Application Priority Data

Dec. 9, 2013 (CN) .......................... 2013 1 0658569

(51) Int. Cl.
*G02B 13/18* (2006.01)
*G02B 9/60* (2006.01)
(Continued)

(52) U.S. Cl.
CPC ..... *G02B 13/0015* (2013.01); *G02B 13/0045* (2013.01); *H04N 5/2252* (2013.01);
(Continued)

(58) Field of Classification Search
CPC ...... G02B 13/0045; G02B 9/60; G02B 13/18; G02B 5/005; G02B 13/0015; G02B 3/04; G02B 3/02
(Continued)

(56) References Cited

U.S. PATENT DOCUMENTS 6,972,908 B2 12/2005 Noda
6,994,668 B2 2/2006 Miyano
(Continued)

FOREIGN PATENT DOCUMENTS

CN 101995641 A 3/2011
CN 103185954 A 7/2013
(Continued)

OTHER PUBLICATIONS

Taiwan Application No. 102132768, Office Action dated Sep. 1, 2014, 9 pages. [Google translation].
(Continued)

*Primary Examiner* — Dawayne Pinkney
(74) *Attorney, Agent, or Firm* — Kilpatrick Townsend & Stockton LLP

(57) ABSTRACT

An imaging lens includes first to fifth lens elements arranged from an object side to an image side in the given order. Through designs of surfaces of the lens elements and relevant optical parameters, a short system length of the imaging lens may be achieved while maintaining good optical performance.

20 Claims, 32 Drawing Sheets

Related U.S. Application Data continuation of application No. 14/265,734, filed on Apr. 30, 2014, now Pat. No. 9,213,167.

(51) Int. Cl.
*G02B 13/00* (2006.01)
*H04N 5/225* (2006.01)
*G02B 5/00* (2006.01)
*G02B 3/04* (2006.01)
*G02B 3/02* (2006.01)

(52) U.S. Cl.
CPC ......... *H04N 5/2254* (2013.01); *H04N 5/2257* (2013.01); *G02B 3/02* (2013.01); *G02B 3/04* (2013.01); *G02B 5/005* (2013.01); *G02B 9/60* (2013.01); *G02B 13/18* (2013.01)

(58) Field of Classification Search
USPC .................................. 359/714, 740, 763, 764
See application file for complete search history.

(56) References Cited

U.S. PATENT DOCUMENTS

| | | | |
|---|---|---|---|
| 6,995,925 | B2 | 2/2006 | Noda |
| 7,006,300 | B2 | 2/2006 | Shinohara |
| 7,164,539 | B2 | 1/2007 | Tomioka |
| 7,230,776 | B2 | 6/2007 | Yamamoto |
| 7,724,446 | B2 | 5/2010 | Chang |
| 7,826,151 | B2 | 11/2010 | Tsai |
| 8,000,030 | B2 | 8/2011 | Tang |
| 8,000,031 | B1 | 8/2011 | Tsai |
| 8,310,768 | B2 | 11/2012 | Lin et al. |
| 8,355,215 | B2 | 1/2013 | Asami |
| 8,379,323 | B2 | 2/2013 | Huang et al. |
| 8,385,006 | B2 | 2/2013 | Tsai et al. |
| 8,432,619 | B2 | 4/2013 | Huang |
| 8,472,128 | B2 | 6/2013 | Huang |
| 8,477,431 | B2 | 7/2013 | Huang |
| 8,514,499 | B2 | 8/2013 | Hsu et al. |
| 8,976,463 | B1 | 3/2015 | Chang et al. |
| 9,213,167 | B2 | 12/2015 | Chen et al. |
| 9,706,090 | B2 | 7/2017 | Chen et al. |
| 9,874,717 | B2 | 1/2018 | Chen et al. |
| 2007/0229984 | A1 | 10/2007 | Shinohara |
| 2007/0236811 | A1 | 10/2007 | Mori |
| 2011/0310494 | A1* | 12/2011 | Ise ..................... G02B 13/0045 359/714 |
| 2012/0069455 | A1 | 3/2012 | Lin et al. |
| 2012/0154929 | A1 | 6/2012 | Tsai et al. |
| 2012/0188654 | A1 | 7/2012 | Huang |
| 2012/0194726 | A1 | 8/2012 | Huang et al. |
| 2012/0206822 | A1 | 8/2012 | Hsieh et al. |
| 2012/0243108 | A1 | 9/2012 | Tsai et al. |
| 2013/0003193 | A1 | 1/2013 | Huang |
| 2013/0033637 | A1 | 2/2013 | Sano |
| 2013/0077181 | A1 | 3/2013 | Chen et al. |
| 2013/0088788 | A1 | 4/2013 | You |
| 2013/0100542 | A1 | 4/2013 | Tsai et al. |
| 2013/0265650 | A1 | 10/2013 | Chen et al. |
| 2013/0286488 | A1 | 10/2013 | Chae |
| 2014/0063323 | A1 | 3/2014 | Yamazaki et al. |
| 2014/0153113 | A1 | 6/2014 | Tsai et al. |
| 2014/0153115 | A1* | 6/2014 | Hagiwara .......... G02B 13/0045 359/714 |
| 2015/0009392 | A1* | 1/2015 | Chiang .............. G02B 13/0045 348/335 |
| 2015/0062405 | A1 | 3/2015 | Chen et al. |
| 2015/0160434 | A1 | 6/2015 | Chen et al. |
| 2016/0154209 | A1 | 6/2016 | Chang et al. |
| 2016/0231531 | A1 | 8/2016 | Chen et al. |

FOREIGN PATENT DOCUMENTS

| | | |
|---|---|---|
| JP | 2012155223 A | 8/2012 |
| TW | 201135304 A1 | 10/2011 |
| TW | 201213926 A1 | 4/2012 |
| TW | 201215942 A1 | 4/2012 |
| TW | 201227043 A1 | 7/2012 |
| TW | 201229613 A1 | 7/2012 |
| TW | 201232085 A1 | 8/2012 |
| TW | 201239445 A1 | 10/2012 |
| TW | 201241471 A1 | 10/2012 |
| TW | 201305591 A | 2/2013 |
| TW | 201305652 A1 | 2/2013 |
| TW | 201312155 A1 | 3/2013 |
| TW | 201317609 A1 | 5/2013 |
| TW | 201329501 A1 | 7/2013 |

OTHER PUBLICATIONS

Chinese Application No. 201310658569.2, Office Action dated Sep. 28, 2015, 5 pages. [Translation is not available].
Taiwan Application No. 102132768, Office Action dated Dec. 27, 2016, 10 pages. [Google translation].
U.S. Appl. No. 14/138,322, Non-Final Office Action dated Apr. 7, 2016, 7 pages.
U.S. Appl. No. 14/138,322, Non-Final Office Action dated Sep. 23, 2016, 8 pages.
U.S. Appl. No. 14/138,322, Notice of Allowance dated Mar. 8, 2017, 8 pages.
U.S. Appl. No. 14/265,734, Notice of Allowance dated Aug. 12, 2015, 8 pages.
U.S. Appl. No. 14/814,121, Advisory Action dated Jul. 28, 2017, 2 pages.
U.S. Appl. No. 14/814,121, Final Office Action dated May 11, 2017, 12 pages.
U.S. Appl. No. 14/814,121, Non Final Office Action dated Jan. 30, 2017, 7 pages.
U.S. Appl. No. 14/814,121, Non-Final Office Action dated Jul. 29, 2016, 12 pages.
U.S. Appl. No. 14/933,161, Final Office Action dated Jun. 19, 2017, 8 pages.
U.S. Appl. No. 14/933,161, Non-Final Office Action dated Dec. 16, 2016, 24 pages.
U.S. Appl. No. 14/933,161, Notice of Allowance dated Sep. 22, 2017, 7 pages.

* cited by examiner

| system focal length =4.109mm, half field-of-view =36.136°, F-number =2.08, system length =4.929mm |||||||
|---|---|---|---|---|---|---|
| lens element | surface | radius of curvature | thickness | refractive index | Abbe number | material | focal length |
| object | | ∞ | ∞ | | | | |
| | | ∞ | 0.03 | | | | |
| first lens element 3 | object-side surface 31 | 1.594786 | 0.64 | 1.544 | 56.114 | plastic | 3.43303 |
| | image-side surface 32 | 9.374746 | 0.03 | | | | |
| aperture stop 2 | | ∞ | 0.1 | | | | |
| second lens element 4 | object-side surface 41 | -3.231304 | 0.26 | 1.64 | 23.529 | plastic | -4.13183 |
| | image-side surface 42 | 15.01552 | 0.17 | | | | |
| third lens element 5 | object-side surface 51 | 1.512669 | 0.42 | 1.535 | 55.635 | plastic | 6.46641 |
| | image-side surface 52 | 2.427859 | 0.6 | | | | |
| fourth lens element 6 | object-side surface 61 | -3.19433 | 0.625 | 1.535 | 55.635 | plastic | 3.45705 |
| | image-side surface 62 | -1.251201 | 0.108 | | | | |
| fifth lens element 7 | object-side surface 71 | 12.51405 | 0.58 | 1.535 | 55.635 | plastic | -3.14917 |
| | image-side surface 72 | 1.460903 | 0.5 | | | | |
| optical filter 8 | object-side surface 81 | ∞ | 0.21 | | | | |
| | image-side surface 82 | ∞ | 0.6856444 | | | | |
| image plane 9 | | ∞ | | | | | |

FIG.3

| surface | 31 | 32 | 41 | 42 | 51 |
|---|---|---|---|---|---|
| K | 0.00000E+00 | 0.00000E+00 | 0.00000E+00 | 0.00000E+00 | 0.00000E+00 |
| a4 | -4.41386E-03 | -6.07483E-03 | 1.88235E-01 | 6.21745E-02 | -1.94000E-01 |
| a6 | -4.66111E-02 | -1.21871E-01 | -1.75587E-01 | 7.39940E-02 | 5.12740E-02 |
| a8 | 5.72003E-02 | 5.67017E-02 | 1.43298E-01 | -1.21326E-02 | -8.20188E-03 |
| a10 | -4.77976E-02 | 1.48660E-02 | -4.17805E-02 | 1.85010E-02 | -6.09505E-02 |
| a12 | -2.68472E-03 | -4.06489E-03 | 2.28314E-02 | -3.99157E-03 | 1.08801E-02 |
| a14 | -1.47080E-02 | -2.31594E-02 | 1.92900E-02 | 7.84777E-03 | 5.12332E-02 |
| a16 | 1.11150E-02 | 1.19205E-02 | -2.37944E-02 | -4.54449E-03 | -3.12835E-02 |
| a18 | 0.00000E+00 | 0.00000E+00 | 0.00000E+00 | 0.00000E+00 | 0.00000E+00 |

| surface | 52 | 61 | 62 | 71 | 72 |
|---|---|---|---|---|---|
| K | 0.00000E+00 | 0.00000E+00 | -3.85570E+00 | 0.00000E+00 | -8.33801E+00 |
| a4 | -4.65910E-03 | 6.56723E-02 | -5.56150E-02 | -1.88168E-01 | -1.00265E-01 |
| a6 | -6.62237E-02 | -1.36225E-01 | -1.44515E-02 | 8.03232E-02 | 4.36594E-02 |
| a8 | -1.55083E-02 | 1.70180E-01 | 4.91572E-02 | -1.28656E-02 | -1.53464E-02 |
| a10 | 3.90054E-02 | -1.00958E-01 | -1.47560E-02 | 5.57532E-04 | 3.33786E-03 |
| a12 | -2.12189E-02 | 1.86514E-02 | 1.58738E-03 | 1.87050E-05 | -3.96563E-04 |
| a14 | -4.09307E-04 | 8.47111E-04 | -7.23216E-04 | 2.61377E-06 | 1.68319E-05 |
| a16 | 1.49909E-03 | -2.23847E-04 | 1.69907E-04 | -3.41634E-08 | 4.19877E-07 |
| a18 | 0.00000E+00 | 0.00000E+00 | 0.00000E+00 | 0.00000E+00 | 0.00000E+00 |

FIG.4

| system focal length =4.014mm , half field-of-view =36.777°, F-number =2.038, system length =4.949mm | | | | | | |
|---|---|---|---|---|---|---|
| lens element | surface | radius of curvature | thickness | refractive index | Abbe number | material | focal length |
| object | | ∞ | ∞ | | | | |
| | | ∞ | 0.03 | | | | |
| first lens element 3 | object-side surface 31 | 1.611647 | 0.64 | 1.544 | 56.114 | plastic | 3.57581 |
| | image-side surface 32 | 8.082869 | 0.03 | | | | |
| aperture stop 2 | | ∞ | 0.1 | | | | |
| second lens element 4 | object-side surface 41 | -4.102928 | 0.21 | 1.64 | 23.529 | plastic | -4.89385 |
| | image-side surface 42 | 13.50071 | 0.17 | | | | |
| third lens element 5 | object-side surface 51 | 1.675019 | 0.4 | 1.535 | 55.635 | plastic | 8.74165 |
| | image-side surface 52 | 2.392491 | 0.415 | | | | |
| fourth lens element 6 | object-side surface 61 | -2.159551 | 0.65 | 1.535 | 55.635 | plastic | 5.61813 |
| | image-side surface 62 | -1.388489 | 0.12 | | | | |
| fifth lens element 7 | object-side surface 71 | 2.4294 | 0.58 | 1.535 | 55.635 | plastic | -7.19488 |
| | image-side surface 72 | 1.365461 | 0.5 | | | | |
| optical filter 8 | object-side surface 81 | ∞ | 0.21 | | | | |
| | image-side surface 82 | ∞ | 0.9242577 | | | | |
| image plane 9 | | ∞ | | | | | |

FIG.7

| surface | 31 | 32 | 41 | 42 | 51 |
|---|---|---|---|---|---|
| K | 0.00000E+00 | 0.00000E+00 | 0.00000E+00 | 0.00000E+00 | 0.00000E+00 |
| a4 | -1.07272E-03 | -5.30821E-03 | 1.89969E-01 | 8.45390E-02 | -1.86264E-01 |
| a6 | -4.35460E-02 | -1.25024E-01 | -1.60544E-01 | 8.19748E-02 | 4.16497E-02 |
| a8 | 5.18882E-02 | 5.29954E-02 | 1.46003E-01 | -3.12442E-04 | -2.52231E-02 |
| a10 | -5.00801E-02 | 1.34413E-02 | -4.66850E-02 | 2.05027E-02 | -4.86597E-02 |
| a12 | -1.79770E-03 | -4.68322E-03 | 1.76078E-02 | -1.00248E-02 | 2.05833E-02 |
| a14 | -1.34161E-02 | -2.24353E-02 | 1.86750E-02 | 4.76541E-03 | 4.68354E-02 |
| a16 | 1.10567E-02 | 1.36800E-02 | -1.54125E-02 | 9.39327E-03 | -3.88239E-02 |
| a18 | 0.00000E+00 | 0.00000E+00 | 0.00000E+00 | 0.00000E+00 | 0.00000E+00 |
| surface | 52 | 61 | 62 | 71 | 72 |
| K | 0.00000E+00 | 0.00000E+00 | 0.00000E+00 | 0.00000E+00 | 0.00000E+00 |
| a4 | -9.74532E-03 | 1.07101E-01 | -3.18267E+00 | -2.05345E-01 | -1.04315E-01 |
| a6 | -6.39574E-02 | -1.18113E-01 | -4.65436E-02 | 7.39019E-02 | 4.42047E-02 |
| a8 | -1.18606E-02 | 1.74015E-01 | -1.08146E-02 | -1.34341E-02 | -1.52209E-02 |
| a10 | 4.01081E-02 | -1.00652E-02 | 4.99236E-02 | 6.28189E-04 | 3.34574E-03 |
| a12 | -2.02313E-02 | 1.91451E-02 | -1.51648E-02 | 4.95994E-05 | -4.00540E-04 |
| a14 | -1.08499E-04 | 7.79024E-04 | 1.35530E-03 | 7.03760E-06 | 1.61698E-05 |
| a16 | 8.67231E-04 | -3.07068E-04 | -7.60768E-04 | -1.41104E-06 | 4.98323E-07 |
| a18 | 0.00000E+00 | 0.00000E+00 | 2.03257E-04 | 0.00000E+00 | 0.00000E+00 |

FIG.8

| system focal length =4.003mm , half field-of-view =36.85°, F-number =2.038, system length =4.856mm | | | | | | |
|---|---|---|---|---|---|---|
| lens element | surface | radius of curvature | thickness | refractive index | Abbe number | material | focal length |
| object | | ∞ | ∞ | | | | |
| | | ∞ | 0.03 | | | | |
| first lens element 3 | object-side surface 31 | 1.591166 | 0.6 | 1.544 | 56.114 | plastic | 3.74034 |
| | image-side surface 32 | 6.329161 | 0.035 | | | | |
| aperture stop 2 | | ∞ | 0.11 | | | | |
| second lens element 4 | object-side surface 41 | -4.199765 | 0.2 | 1.64 | 23.529 | plastic | -4.81867 |
| | image-side surface 42 | 11.82326 | 0.17 | | | | |
| third lens element 5 | object-side surface 51 | 1.533009 | 0.365 | 1.535 | 55.635 | plastic | 6.71427 |
| | image-side surface 52 | 2.452401 | 0.48 | | | | |
| fourth lens element 6 | object-side surface 61 | -2.026605 | 0.62 | 1.535 | 55.635 | plastic | 5.35761 |
| | image-side surface 62 | -1.313792 | 0.3 | | | | |
| fifth lens element 7 | object-side surface 71 | 2.456393 | 0.49 | 1.535 | 55.635 | plastic | -5.58044 |
| | image-side surface 72 | 1.253926 | 0.5 | | | | |
| optical filter 8 | object-side surface 81 | ∞ | 0.21 | | | | |
| | image-side surface 82 | ∞ | 0.7758652 | | | | |
| image plane 9 | | ∞ | | | | | |

FIG. 11

| surface | 31 | 32 | 41 | 42 | 51 |
|---|---|---|---|---|---|
| K | 0.00000E+00 | 0.00000E+00 | 0.00000E+00 | 0.00000E+00 | 0.00000E+00 |
| a4 | -6.44036E-03 | -1.34702E-02 | 1.84301E-01 | 7.16155E-02 | -1.78249E-01 |
| a6 | -4.02602E-02 | -1.22698E-01 | -1.64356E-01 | 8.65493E-02 | 4.48395E-02 |
| a8 | 4.49782E-02 | 5.16083E-02 | 1.59891E-01 | 7.41612E-03 | -2.97321E-02 |
| a10 | -5.05964E-02 | 1.30433E-02 | -4.89008E-02 | 1.72624E-02 | -4.19254E-02 |
| a12 | 2.32678E-04 | -5.05516E-03 | 1.04623E-02 | -1.99099E-02 | 1.39998E-02 |
| a14 | -1.24857E-02 | -2.28124E-02 | 1.25236E-02 | -3.14078E-03 | 3.90421E-02 |
| a16 | 9.55274E-03 | 1.30446E-02 | -1.13189E-02 | 1.32707E-02 | -2.97602E-02 |
| a18 | 0.00000E+00 | 0.00000E+00 | 0.00000E+00 | 0.00000E+00 | 0.00000E+00 |
| surface | 52 | 61 | 62 | 71 | 72 |
| K | 0.00000E+00 | 0.00000E+00 | -2.97814E+00 | 0.00000E+00 | -4.72484E+00 |
| a4 | 9.78788E-03 | 7.63459E-02 | -4.56121E-02 | -2.01209E-01 | -1.05989E-01 |
| a6 | -6.77554E-02 | -1.02599E-01 | -1.18180E-02 | 7.26260E-02 | 4.63886E-02 |
| a8 | -1.14694E-02 | 1.74668E-01 | 4.90118E-02 | -1.37566E-02 | -1.55347E-02 |
| a10 | 3.79467E-02 | -9.98644E-02 | -1.52759E-02 | 6.25877E-04 | 3.30391E-03 |
| a12 | -1.99843E-02 | 1.89164E-02 | 1.36663E-03 | 5.52003E-05 | -3.94754E-04 |
| a14 | 6.20547E-04 | 9.09968E-04 | -7.19259E-04 | 7.63305E-06 | 1.64332E-05 |
| a16 | 7.82541E-04 | -3.41144E-04 | 2.20540E-04 | -1.18355E-06 | 4.84847E-07 |
| a18 | 0.00000E+00 | 0.00000E+00 | 0.00000E+00 | 0.00000E+00 | 0.00000E+00 |

FIG.12

FIG.15 system focal length =4.016mm, half field-of-view =36.761°, F-number =2.018, system length =4.976mm

| lens element | surface | radius of curvature | thickness | refractive index | Abbe number | material | focal length |
|---|---|---|---|---|---|---|---|
| object | | ∞ | ∞ | | | | |
| | | ∞ | 0.03 | | | | |
| first lens element 3 | object-side surface 31 | 1.592264 | 0.68 | 1.544 | 56.114 | plastic | 3.53916 |
| | image-side surface 32 | 7.819808 | 0.03 | | | | |
| aperture stop 2 | | ∞ | 0.1 | | | | |
| second lens element 4 | object-side surface 41 | -3.69365 | 0.21 | 1.64 | 23.529 | plastic | -4.61554 |
| | image-side surface 42 | 15.0776 | 0.17 | | | | |
| third lens element 5 | object-side surface 51 | 1.743263 | 0.49 | 1.535 | 55.635 | plastic | 7.96859 |
| | image-side surface 52 | 2.660308 | 0.44 | | | | |
| fourth lens element 6 | object-side surface 61 | -2.138115 | 0.65 | 1.535 | 55.635 | plastic | 5.33509 |
| | image-side surface 62 | -1.351937 | 0.12 | | | | |
| fifth lens element 7 | object-side surface 71 | 2.422132 | 0.58 | 1.535 | 55.635 | plastic | -6.41178 |
| | image-side surface 72 | 1.301204 | 0.5 | | | | |
| optical filter 8 | object-side surface 81 | ∞ | 0.21 | | | | |
| | image-side surface 82 | ∞ | 0.7956988 | | | | |
| image plane 9 | | ∞ | | | | | |

| surface | 31 | 32 | 41 | 42 | 51 |
|---|---|---|---|---|---|
| K | 0.00000E+00 | 0.00000E+00 | 0.00000E+00 | 0.00000E+00 | 0.00000E+00 |
| a4 | -2.73720E-03 | -1.00894E-02 | 1.89649E-01 | 7.67673E-02 | -1.90786E-01 |
| a6 | -4.20009E-02 | -1.23990E-01 | -1.62725E-01 | 8.00666E-02 | 3.97451E-02 |
| a8 | 5.42740E-02 | 5.48213E-02 | 1.46234E-01 | -2.60189E-03 | -2.51542E-02 |
| a10 | -4.82015E-02 | 1.51930E-02 | -4.53499E-02 | 1.95059E-02 | -4.89364E-02 |
| a12 | -9.90303E-04 | -3.45845E-03 | 1.90218E-02 | -8.70871E-03 | 2.07779E-02 |
| a14 | -1.35585E-02 | -2.21503E-02 | 1.95365E-02 | 8.44132E-03 | 4.60814E-02 |
| a16 | 1.03318E-02 | 1.25786E-02 | -1.55543E-02 | 1.50842E-02 | -4.20810E-02 |
| a18 | 0.00000E+00 | 0.00000E+00 | 0.00000E+00 | 0.00000E+00 | 0.00000E+00 |
| surface | 52 | 61 | 62 | 71 | 72 |
| K | 0.00000E+00 | 0.00000E+00 | -3.09641E+00 | 0.00000E+00 | -4.85244E+00 |
| a4 | -3.75053E-03 | 1.03652E-01 | -4.75960E-01 | -2.03182E-01 | -1.04256E-01 |
| a6 | -6.17725E-02 | -1.18504E-01 | -1.10544E-02 | 7.40447E-02 | 4.42746E-02 |
| a8 | -1.17290E-02 | 1.73952E-01 | 4.99059E-02 | -1.34263E-02 | -1.51841E-02 |
| a10 | 3.89907E-02 | -1.00484E-01 | -1.51544E-02 | 6.28154E-04 | 3.34808E-03 |
| a12 | -2.07316E-02 | 1.92352E-02 | 1.36391E-03 | 4.90477E-05 | -4.00816E-04 |
| a14 | 9.03784E-05 | 7.99682E-04 | -7.55814E-04 | 6.75902E-06 | 1.60795E-05 |
| a16 | 1.21525E-03 | -3.09277E-04 | 2.05637E-04 | -1.50950E-06 | 4.85194E-07 |
| a18 | 0.00000E+00 | 0.00000E+00 | 0.00000E+00 | 0.00000E+00 | 0.00000E+00 |

FIG.16

| system focal length =4.086mm , half field-of-view =36.285, F-number =2.055, system length =5.007mm | | | | | | |
|---|---|---|---|---|---|---|
| lens element | surface | radius of curvature | thickness | refractive index | Abbe number | material | focal length |
| object | | ∞ | ∞ | | | | |
| | | ∞ | 0.03 | | | | |
| first lens element 3 | object-side surface 31 | 1.624557 | 0.57 | 1.544 | 56.114 | plastic | 3.83978 |
| | image-side surface 32 | 6.405461 | 0.035 | | | | |
| aperture stop 2 | | ∞ | 0.11 | | | | |
| second lens element 4 | object-side surface 41 | -3.54593 | 0.2 | 1.64 | 23.529 | plastic | -4.46816 |
| | image-side surface 42 | 15.09991 | 0.17 | | | | |
| third lens element 5 | object-side surface 51 | 1.518999 | 0.44 | 1.535 | 55.635 | plastic | 5.18384 |
| | image-side surface 52 | 3.019412 | 0.54 | | | | |
| fourth lens element 6 | object-side surface 61 | -2.339227 | 0.7 | 1.535 | 55.635 | plastic | 6.38850 |
| | image-side surface 62 | -1.533589 | 0.44 | | | | |
| fifth lens element 7 | object-side surface 71 | 4.286226 | 0.7 | 1.535 | 55.635 | plastic | -4.40204 |
| | image-side surface 72 | 1.433432 | 0.5 | | | | |
| optical filter 8 | object-side surface 81 | ∞ | 0.21 | | | | |
| | image-side surface 82 | ∞ | 0.3921183 | | | | |
| image plane 9 | | ∞ | | | | | |

FIG.19

| surface | 31 | 32 | 41 | 42 | 51 |
|---|---|---|---|---|---|
| K | 0.00000E+00 | 0.00000E+00 | 0.00000E+00 | 0.00000E+00 | 0.00000E+00 |
| a4 | -1.17323E-02 | -1.92385E-02 | 1.83660E-01 | 5.33525E-02 | -1.76267E-01 |
| a6 | -3.67844E-02 | -1.18702E-01 | -1.59980E-01 | 8.89793E-02 | 5.15600E-02 |
| a8 | 3.98339E-02 | 5.21260E-02 | 1.69147E-01 | 1.02677E-02 | -2.52552E-02 |
| a10 | -5.30511E-02 | 1.36292E-02 | -4.81505E-02 | 1.76470E-02 | -3.43900E-02 |
| a12 | 2.21270E-04 | -4.94760E-03 | 4.74509E-03 | -2.32555E-02 | 7.44420E-03 |
| a14 | -1.16342E-02 | -2.33551E-02 | 7.60484E-03 | -6.89244E-03 | 3.23307E-02 |
| a16 | 1.00024E-02 | 1.19488E-02 | -7.86725E-03 | 1.08470E-02 | -2.19083E-02 |
| a18 | 0.00000E+00 | 0.00000E+00 | 0.00000E+00 | 0.00000E+00 | 0.00000E+00 |
| surface | 52 | 61 | 62 | 71 | 72 |
| K | 0.00000E+00 | 0.00000E+00 | -2.90939E+00 | 0.00000E+00 | -4.50587E+00 |
| a4 | 2.67027E-02 | 5.75053E-02 | -4.63575E-02 | -1.81615E-01 | -9.63097E-02 |
| a6 | -6.67979E-02 | -1.05759E-01 | -1.09089E-02 | 7.38424E-02 | 4.48382E-02 |
| a8 | -1.10174E-02 | 1.73014E-01 | 4.94543E-02 | -1.40550E-02 | -1.54696E-02 |
| a10 | 3.58888E-02 | -1.00173E-01 | -1.52786E-02 | 5.85864E-04 | 3.33343E-03 |
| a12 | -2.03798E-02 | 1.91258E-02 | 1.27444E-03 | 5.77450E-05 | -3.92061E-04 |
| a14 | 1.03968E-03 | 1.03574E-03 | -7.52627E-04 | 9.65935E-06 | 1.62003E-05 |
| a16 | 8.79530E-04 | -4.24914E-04 | 2.24801E-04 | -7.36049E-07 | 3.27153E-07 |
| a18 | 0.00000E+00 | 0.00000E+00 | 0.00000E+00 | 0.00000E+00 | 0.00000E+00 |

FIG.20

| system focal length =3.804mm , half field-of-view =38.28°, F-number =1.933, system length =4.513mm ||||||||
|---|---|---|---|---|---|---|---|
| lens element | surface | | radius of curvature | thickness | refractive index | Abbe number | material | focal length |
| object | | | ∞ | ∞ | | | | |
| | | | ∞ | 0.03 | | | | |
| first lens element 3 | object-side surface 31 | 1.517434 | 0.6156421 | 1.544 | 56.114 | plastic | 3.01925 |
| | image-side surface 32 | 17.0834 | 0.02277382 | | | | |
| aperture stop 2 | | ∞ | 0.08300649 | | | | |
| second lens element 4 | object-side surface 41 | -3.04804 | 0.2403302 | 1.64 | 23.529 | plastic | -3.96454 |
| | image-side surface 42 | 15.60853 | 0.1729096 | | | | |
| third lens element 5 | object-side surface 51 | 1.506346 | 0.3770171 | 1.535 | 55.635 | plastic | 7.13425 |
| | image-side surface 52 | 2.271354 | 0.590688 | | | | |
| fourth lens element 6 | object-side surface 61 | -2.946473 | 0.5952859 | 1.535 | 55.635 | plastic | 3.44610 |
| | image-side surface 62 | -1.213916 | 0.2546857 | | | | |
| fifth lens element 7 | object-side surface 71 | 12.9874 | 0.5173129 | 1.535 | 55.635 | plastic | -2.71272 |
| | image-side surface 72 | 1.287304 | 0.5 | | | | |
| optical filter 8 | object-side surface 81 | ∞ | 0.21 | | | | |
| | image-side surface 82 | ∞ | 0.3330018 | | | | |
| image plane 9 | | ∞ | | | | | |

FIG.23

| surface | 31 | 32 | 41 | 42 | 51 |
|---|---|---|---|---|---|
| K | 1.97822E-02 | 1.77387E+00 | 1.85536E-01 | -4.61340E+01 | 1.28108E-02 |
| a4 | 2.10854E-03 | 1.08092E-02 | 2.01288E-01 | 7.02205E-02 | -1.99884E-01 |
| a6 | -4.80743E-02 | -1.18583E-01 | -1.46166E-01 | 9.55998E-02 | 2.83346E-02 |
| a8 | 5.60502E-02 | 5.09357E-02 | 1.42685E-01 | 3.29796E-03 | 4.43455E-03 |
| a10 | -6.03620E-02 | 1.20657E-02 | -4.23652E-02 | 2.77279E-02 | -5.64971E-02 |
| a12 | -1.03604E-02 | -6.73082E-03 | 2.81968E-02 | -3.00358E-03 | 1.29683E-02 |
| a14 | -1.68922E-02 | -2.66332E-02 | 2.65435E-02 | 8.35241E-03 | 4.89084E-02 |
| a16 | 1.49570E-02 | 1.45730E-02 | -3.35437E-02 | 1.13823E-03 | -3.09087E-02 |
| a18 | 0.00000E+00 | 0.00000E+00 | 0.00000E+00 | 0.00000E+00 | 0.00000E+00 |
| surface | 52 | 61 | 62 | 71 | 72 |
| K | 1.31736E-01 | -2.53923E-01 | -4.31599E+00 | -1.92255E+00 | -7.43765E+00 |
| a4 | -5.60312E-03 | 7.76167E-02 | -6.95870E-02 | -2.06449E-01 | -9.85441E-02 |
| a6 | -7.05087E-02 | -1.48863E-01 | -1.69126E-02 | 7.97924E-02 | 3.97871E-02 |
| a8 | -1.73384E-02 | 1.75000E-01 | 5.06549E-02 | -1.18962E-02 | -1.40510E-02 |
| a10 | 4.61788E-02 | -1.01202E-01 | -1.49606E-02 | 5.76937E-04 | 3.07927E-03 |
| a12 | -1.94771E-02 | 1.93022E-02 | 1.64289E-03 | 4.33870E-06 | -3.72995E-04 |
| a14 | -8.72647E-04 | 9.40595E-04 | -7.23839E-04 | 6.24129E-07 | 1.62858E-05 |
| a16 | 1.41656E-03 | -1.47369E-04 | 1.66626E-04 | 7.42048E-08 | 3.87882E-07 |
| a18 | 0.00000E+00 | 0.00000E+00 | 0.00000E+00 | 0.00000E+00 | 0.00000E+00 |

FIG.24

| system focal length =3.734mm, half field-of-view =38.461°, F-number =1.949, system length =4.630mm |||||||
|---|---|---|---|---|---|---|
| lens element | surface | radius of curvature | thickness | refractive index | Abbe number | material | focal length |
| object | | ∞ | ∞ | | | | |
| | | ∞ | 0.03 | | | | |
| first lens element 3 | object-side surface 31 | 1.602434 | 0.5350569 | 1.544 | 56.114 | plastic | 3.21863 |
| | image-side surface 32 | 16.67093 | 0.008856473 | | | | |
| aperture stop 2 | | ∞ | 0.1107182 | | | | |
| second lens element 4 | object-side surface 41 | -2.907108 | 0.253242 | 1.64 | 23.529 | plastic | -4.16729 |
| | image-side surface 42 | 33.39816 | 0.1925985 | | | | |
| third lens element 5 | object-side surface 51 | 1.470499 | 0.4334858 | 1.535 | 55.635 | plastic | 6.49651 |
| | image-side surface 52 | 2.2287029 | 0.5776494 | | | | |
| fourth lens element 6 | object-side surface 61 | -3.317461 | 0.6733896 | 1.535 | 55.635 | plastic | 3.45611 |
| | image-side surface 62 | -1.271274 | 0.3057792 | | | | |
| fifth lens element 7 | object-side surface 71 | 16.00911 | 0.5141073 | 1.535 | 55.635 | plastic | -2.80045 |
| | image-side surface 72 | 1.35469 | 0.5 | | | | |
| optical filter 8 | object-side surface 81 | ∞ | 0.21 | | | | |
| | image-side surface 82 | ∞ | 0.3155249 | | | | |
| image plane 9 | | ∞ | | | | | |

FIG.27

| surface | 31 | 32 | 41 | 42 | 51 |
|---|---|---|---|---|---|
| K | -1.70086E-02 | 5.84368E+01 | -9.23748E-01 | 7.61928E+01 | 4.12813E-02 |
| a4 | 1.40736E-03 | 1.49272E-02 | 2.04892E-01 | 6.66508E-02 | -1.99544E-01 |
| a6 | -5.72638E-02 | -1.17316E-01 | -1.36883E-01 | 8.55438E-02 | 3.94503E-02 |
| a8 | 4.91140E-02 | 4.97384E-02 | 1.44525E-01 | 2.54350E-03 | 5.74127E-03 |
| a10 | -6.43331E-02 | 8.96252E-03 | -4.28168E-02 | 2.94374E-02 | -5.73353E-02 |
| a12 | -9.79829E-03 | -1.10017E-02 | 2.41848E-02 | -8.54805E-03 | 1.08552E-02 |
| a14 | -1.55033E-02 | -2.92127E-02 | 2.16018E-02 | -8.65193E-03 | 4.66133E-02 |
| a16 | 1.60995E-02 | 1.57080E-02 | -3.89721E-02 | -7.12372E-03 | -2.74360E-02 |
| a18 | 0.00000E+00 | 0.00000E+00 | 0.00000E+00 | 0.00000E+00 | 0.00000E+00 |
| surface | 52 | 61 | 62 | 71 | 72 |
| K | 2.94879E-01 | -4.21759E-01 | -4.25187E+00 | 3.36860E+00 | -7.58579E+00 |
| a4 | -2.50820E-03 | 7.38967E-02 | -6.77752E-02 | -2.06758E-01 | -9.68938E-02 |
| a6 | -6.97524E-02 | -1.46686E-01 | -1.57500E-02 | 7.97991E-02 | 3.99532E-02 |
| a8 | -1.66982E-02 | 1.75920E-01 | 5.08437E-02 | -1.18787E-02 | -1.40165E-02 |
| a10 | 4.68469E-02 | -1.00847E-01 | -1.49663E-02 | 5.81813E-04 | 3.08415E-03 |
| a12 | -2.02775E-02 | 1.91995E-02 | 1.62687E-03 | 5.57460E-06 | -3.72473E-04 |
| a14 | -1.72227E-03 | 6.68863E-04 | -7.35585E-04 | 6.88821E-07 | 1.62093E-05 |
| a16 | 1.73281E-03 | -4.04826E-04 | 1.67810E-04 | -2.45251E-10 | 3.60016E-07 |
| a18 | 0.00000E+00 | 0.00000E+00 | 0.00000E+00 | 0.00000E+00 | 0.00000E+00 |

FIG.28

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| TTL | 4.929 | 4.949 | 4.856 | 4.976 | 5.007 | 4.513 | 4.630 |
| ALT | 2.525 | 2.480 | 2.275 | 2.610 | 2.610 | 2.346 | 2.409 |
| Gaa | 1.008 | 0.835 | 1.095 | 0.860 | 1.295 | 1.124 | 1.196 |
| TTL/G45 | 45.636 | 41.244 | 16.186 | 41.464 | 11.380 | 17.719 | 15.143 |
| TTL/T2 | 18.956 | 23.568 | 24.279 | 23.694 | 25.036 | 18.777 | 18.285 |
| Gaa/T1 | 1.575 | 1.305 | 1.825 | 1.265 | 2.272 | 1.826 | 2.235 |
| ALT/G45 | 23.380 | 20.667 | 7.583 | 21.750 | 5.932 | 9.210 | 7.879 |
| ALT/Gaa | 2.505 | 2.970 | 2.078 | 3.035 | 2.015 | 2.087 | 2.015 |
| Gaa/T3 | 2.400 | 2.088 | 3.000 | 1.755 | 2.943 | 2.981 | 2.758 |
| ALT/G34 | 4.208 | 5.976 | 4.740 | 5.932 | 4.833 | 3.971 | 4.171 |
| Gaa/G23 | 5.929 | 4.912 | 6.441 | 5.059 | 7.618 | 6.501 | 6.208 |
| Gaa/G34 | 1.680 | 2.012 | 2.281 | 1.955 | 2.398 | 1.903 | 2.070 |
| TTL/T4 | 7.886 | 7.614 | 7.832 | 7.655 | 7.153 | 7.581 | 6.876 |
| TTL/Gaa | 4.890 | 5.927 | 4.435 | 5.786 | 3.867 | 4.015 | 3.873 |
| TTL/ALT | 1.952 | 1.996 | 2.134 | 1.906 | 1.918 | 1.924 | 1.922 |
| TTL/T4 | 7.886 | 7.614 | 7.832 | 7.655 | 7.153 | 7.581 | 6.876 |
| ALT/T1 | 3.945 | 3.875 | 3.792 | 3.838 | 4.579 | 3.810 | 4.503 |

FIG.30

IMAGING LENS, AND ELECTRONIC APPARATUS INCLUDING THE SAME

CROSS-REFERENCES TO RELATED APPLICATIONS

This application is a continuation of U.S. application Ser. No. 14/933,161, filed on Nov. 5, 2015, which is a continuation of U.S. application Ser. No. 14/265,734, filed on Apr. 30, 2014, the disclosures of which are hereby incorporated by reference in their entirety for all purposes. U.S. application Ser. No. 14/265,734 claims the benefit and priority to Chinese Application No. 201310658569.2, filed on Dec. 9, 2013, the disclosure of which is hereby incorporated by reference in its entirety for all purposes.

BACKGROUND OF THE INVENTION

Field of the Invention

The present invention relates to an imaging lens and an electronic apparatus including the same.

Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

U.S. patent application publication no. 20070236811 discloses a conventional imaging lens that includes five lens elements, that has a distortion close to five percent and that has a system length of 12 mm. Such a conventional imaging lens is insufficient to constrain the distortion and is unsuitable for use in an electronic device that focuses on slim size and that may have a thickness of only 10 mm.

Another conventional imaging lens with five lens elements disclosed in U.S. patent application publication no. 20070229984 offers an improvement in image quality and has a system length reduced to 8 mm. However, the size of such a conventional imaging lens is still unsuitable for current consumer electronic devices.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises a first lens element, an aperture stop, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has an object-side surface facing toward the object side and an image-side surface facing toward the image side.

The object-side surface of the first lens element has a convex portion in a vicinity of a periphery of the first lens element.

The image-side surface of the second lens element has a concave portion in a vicinity of a periphery of the second lens element.

The object-side surface of the third lens element has a convex portion in a vicinity of the optical axis, and the image-side surface of the third lens element has a concave portion in a vicinity of the optical axis.

The object-side surface of the fourth lens element has a concave portion in a vicinity of the optical axis.

The fifth lens element is made of a plastic material, and the image-side surface of the fifth lens element has a concave portion in a vicinity of the optical axis.

The imaging lens satisfies ALT/T5≤4.7, where T5 represents a thickness of the fifth lens element at the optical axis, and ALT represents a sum of thicknesses of the first lens element, the second lens element, the third lens element, the fourth lens element and the fifth lens element at the optical axis.

The imaging lens does not include any lens element with a refractive power other than the first lens element, the second lens element, the third lens element, the fourth lens element and the fifth lens element.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical data corresponding to the imaging lens of the first preferred embodiment;

FIG. 4 shows values of some aspherical coefficients corresponding to the imaging lens of the first preferred embodiment;

FIG. 7 shows values of some optical data corresponding to the imaging lens of the second preferred embodiment;

FIG. 8 shows values of some aspherical coefficients corresponding to the imaging lens of the second preferred embodiment;

FIG. 11 shows values of some optical data corresponding to the imaging lens of the third preferred embodiment;

FIG. 12 shows values of some aspherical coefficients corresponding to the imaging lens of the third preferred embodiment;

FIG. 15 shows values of some optical data corresponding to the imaging lens of the fourth preferred embodiment;

FIG. 16 shows values of some aspherical coefficients corresponding to the imaging lens of the fourth preferred embodiment;

FIG. 19 shows values of some optical data corresponding to the imaging lens of the fifth preferred embodiment;

FIG. 20 shows values of some aspherical coefficients corresponding to the imaging lens of the fifth preferred embodiment;

FIG. 23 shows values of some optical data corresponding to the imaging lens of the sixth preferred embodiment;

FIG. 24 shows values of some aspherical coefficients corresponding to the imaging lens of the sixth preferred embodiment;

FIG. 27 shows values of some optical data corresponding to the imaging lens of the seventh preferred embodiment;

FIG. 28 shows values of some aspherical coefficients corresponding to the imaging lens of the seventh preferred embodiment;

FIG. 30 is a table that lists values of relationships among some lens parameters corresponding to the imaging lenses of the first to seventh preferred embodiments;

DETAILED DESCRIPTION OF THE INVENTION

Figure 1:
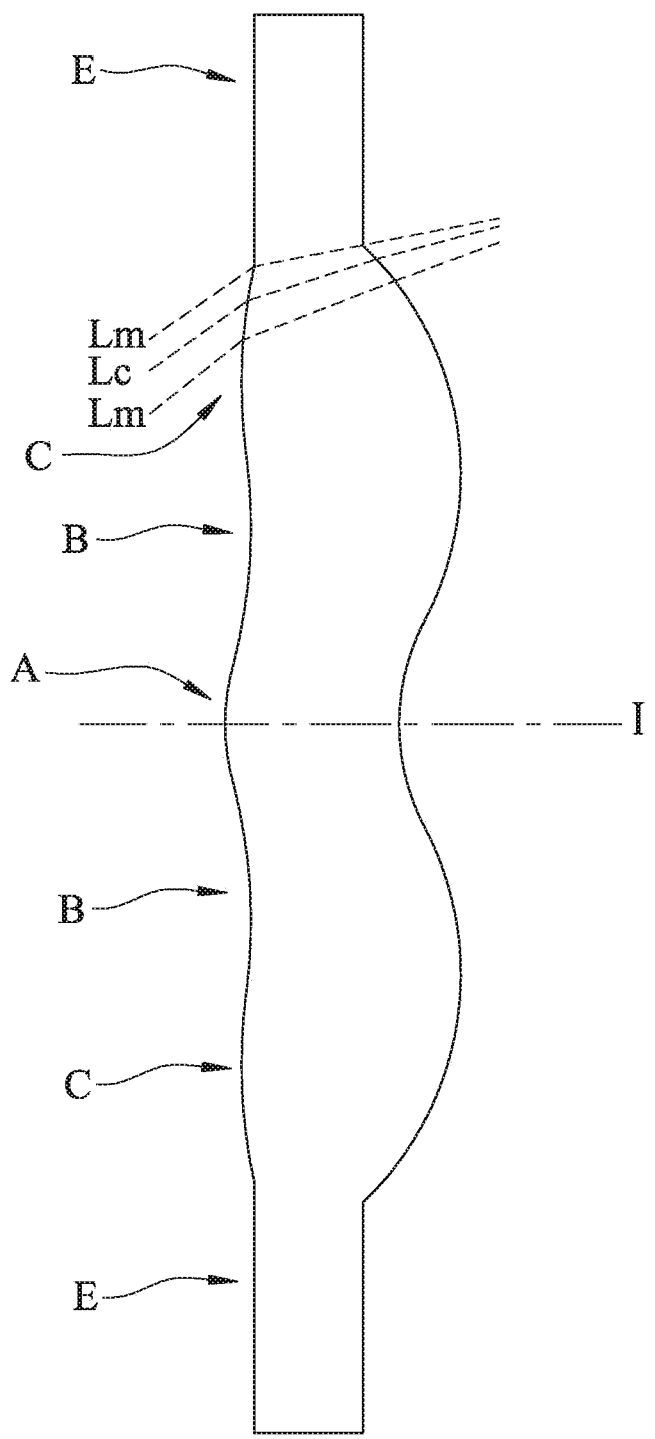
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to the certain area, the certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
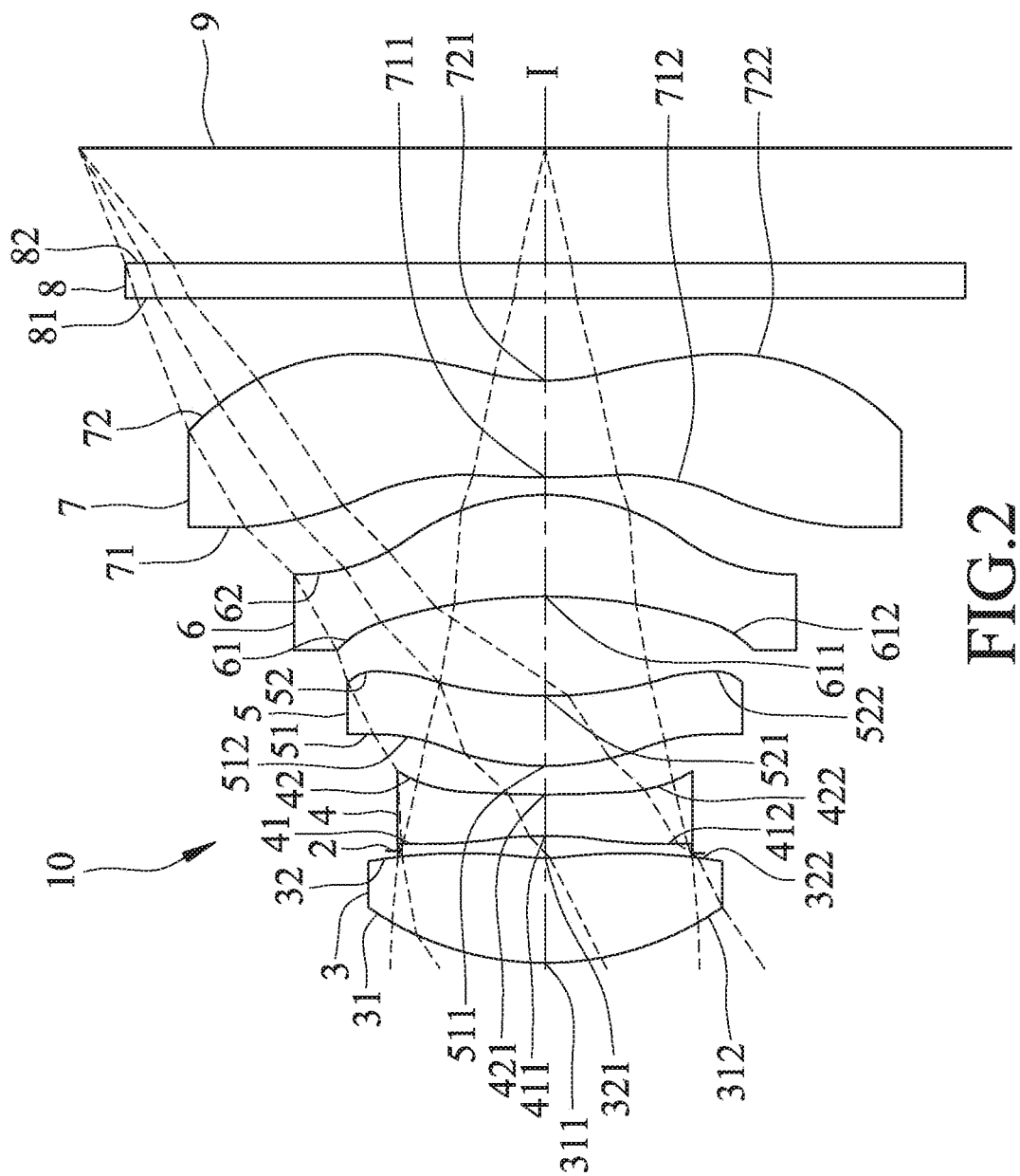
FIG. 2 is a schematic diagram that illustrates the first preferred embodiment of an imaging lens according to the present invention.

Referring to FIG. 2, the first preferred embodiment of an imaging lens 10 according to the present invention includes a first lens element 3, an aperture stop 2, a second lens element 4, a third lens element 5, a fourth lens element 6, a fifth lens element 7, and an optical filter 8 arranged in the given order along an optical axis (I) from an object side to an image side. The optical filter 8 is an infrared cut filter for selectively absorbing infrared light to thereby reduce imperfection of images formed at an image plane 9. However, in some embodiments, the optical filter 8 may be a visible light filter that only allows passage of infrared light for use in an infrared detector.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the object-side and image-side surfaces 31, 32 of the first lens element 3, the aperture stop 2, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 9. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of the lens elements 3-6 may be made of other materials in other embodiments. In addition, each of the lens elements 3-7 has a refractive power.

In the first preferred embodiment, which is depicted in FIG. 2, the first lens element 3 has a positive refractive power. The object-side surface 31 of the first lens element 3 has a convex portion 311 in a vicinity of the optical axis (I), and a convex portion 312 in a vicinity of a periphery of the first lens element 3. The image-side surface 32 of the first lens element 3 has a concave portion 321 in a vicinity of the optical axis (I), and a convex portion 322 in a vicinity of the periphery of the first lens element 3.

The second lens element 4 has a negative refractive power. The object-side surface 41 of the second lens element 4 has a concave portion 411 in a vicinity of the optical axis (I), and a convex portion 412 in a vicinity of a periphery of the second lens element 4. The image-side surface 42 of the second lens element 4 has a concave portion 421 in a vicinity of the optical axis (I), and a concave portion 422 in a vicinity of the periphery of the second lens element 4.

The third lens element 5 has a positive refractive power. The object-side surface 51 of the third lens element 5 has a convex portion 511 in a vicinity of the optical axis (I), and a concave portion 512 in a vicinity of a periphery of the third lens element 5. The image-side surface 52 of the third lens element 5 has a concave portion 521 in a vicinity of the optical axis (I), and a convex portion 522 in a vicinity of the periphery of the third lens element 5.

The fourth lens element 6 has a positive refractive power. The object-side surface 61 of the fourth lens element 6 has a concave portion 611 in a vicinity of the optical axis (I), and a concave portion 612 in a vicinity of a periphery of the fourth lens element 6. The image-side surface 62 of the fourth lens element 6 is a convex surface.

The fifth lens element 7 has a negative refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

The imaging lens 10 satisfies ALT/T5≤4.7, where T5 represents a thickness of the fifth lens element 7 at the optical axis (I), and ALT represents a sum of thicknesses of the first lens element 3, the second lens element 4, the third lens element 5, the fourth lens element 6 and the fifth lens element 7 at the optical axis (I). Since the fifth lens element 7 has an optical effective diameter greater than that of each of the lens elements 3-6, reduction in T5 is relatively difficult. Thus, when T5 has been determined, smaller ALT/T5 refers to smaller ALT, which contributes to reduction in the overall system length. When this relationship is satisfied, optical performance is still relatively good even with the reduced system length.

In the first preferred embodiment, the imaging lens 10 does not include any lens element with refractive power other than the aforethe lens elements 3-7.

Shown in FIG. 3 is a table that lists values of some optical data corresponding to the surfaces 31-81, 32-82 of the first preferred embodiment. The imaging lens 10 has an overall system effective focal length (EFL) of 4.109 mm, a half field-of-view (HFOV) of 36.136°, an F-number of 2.08, and a system length of 4.929 mm. The system length refers to a distance between the object-side surface 31 of the first lens element 3 and the image plane 9 at the optical axis (I).

In this embodiment, each of the object-side surfaces 31-71 and the image-side surfaces 32-72 is aspherical, and satisfies the relationship of $$Z(Y) = \frac{Y^2}{R} \bigg/ \left(1 + \sqrt{1-(1+K)\frac{Y^2}{R^2}}\right) + \sum_{i=1}^{n} a_i x Y^i \quad (1)$$

where:

R represents a radius of curvature of an aspherical surface;

Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_i$ represents an $i^{th}$ aspherical coefficient.

Shown in FIG. 4 is a table that lists values of some aspherical parameters of the aforementioned relationship (1) corresponding to the first preferred embodiment.

Relationships among some of the lens parameters corresponding to the first preferred embodiment are as follows:

$TTL$=4.929; $ALT$=2.525; $Gaa$=1.008;

$TTL/G45$=45.636; $TTL/T2$=18.956;

$Gaa/T1$=1.575; $ALT/G45$=23.380;

$ALT/Gaa$=2.505; $Gaa/T3$=2.400;

$ALT/G34$=4.208; $Gaa/G23$=5.929;

$Gaa/G34$=1.680; $TTL/T4$=7.886;

$TTL/Gaa$=4.890; $TTL/ALT$=1.952;

and $ALT/T1$=3.945, where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

G23 represents an air gap length between the second lens element 4 and the third lens element 5 at the optical axis (I);

G34 represents an air gap length between the third lens element 5 and the fourth lens element 6 at the optical axis (I);

G45 represents an air gap length between the fourth lens element 6 and the fifth lens element 7 at the optical axis (I);

Gaa represents a sum of four air gap lengths among the first lens element 3, the second lens element 4, the third lens element 5, the fourth lens element 6 and the fifth lens element 7 at the optical axis (I);

ALT represents a sum of thicknesses of the lens elements 3-7 at the optical axis (I); and TTL represents a distance at the optical axis (I) between the object-side surface 31 of the first lens element 3 and the image plane 9 at the image side.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figure 5:
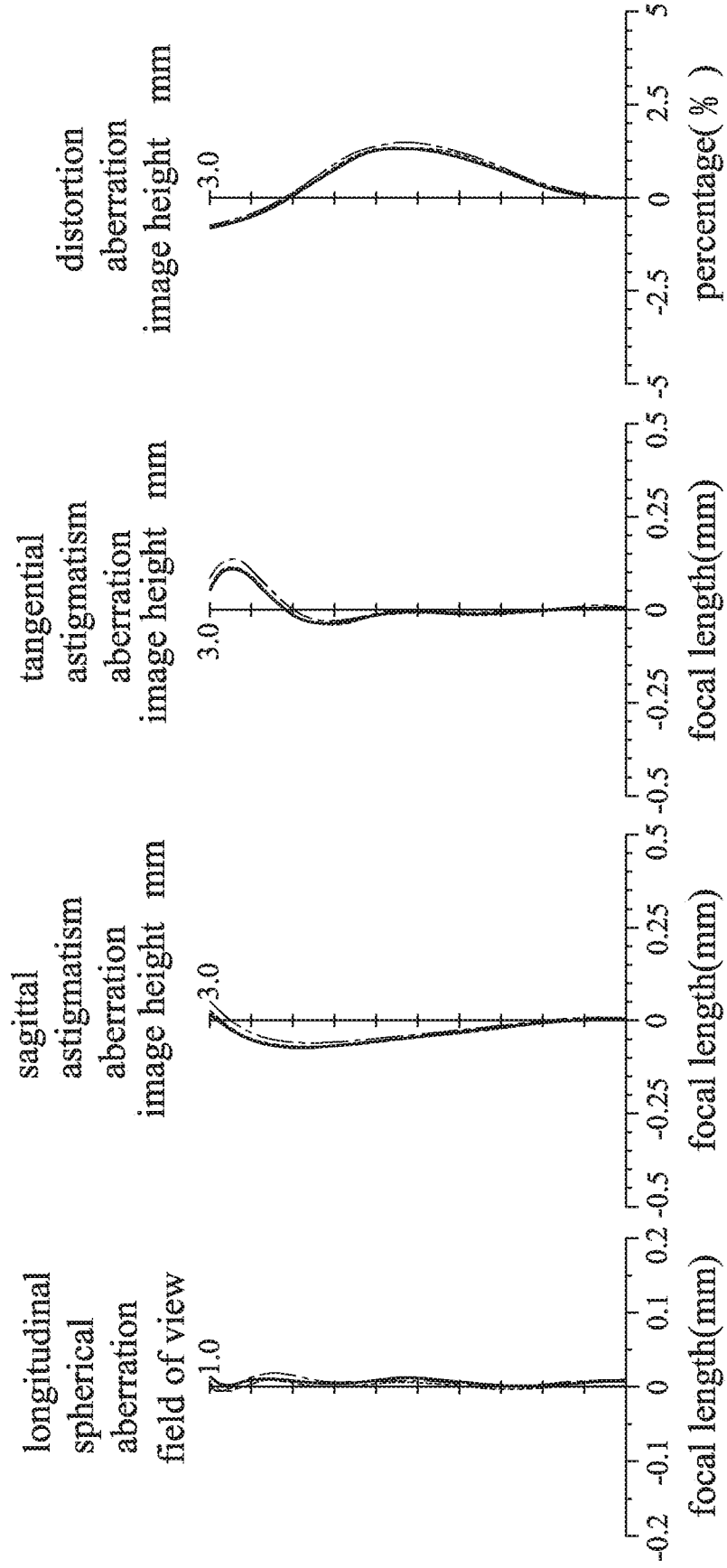
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.03 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.2 mm of focal length, the first preferred embodiment has a relatively low optical aberration.

Moreover, as shown in FIG. 5(d), since each of the curves corresponding to distortion aberration falls within the range of ±2%, the first preferred embodiment is able to meet requirements in imaging quality of most optical systems.

In view of the above, even with the system length reduced down to 4.929 mm, the imaging lens 10 of the first preferred embodiment is still able to achieve a relatively good optical performance.

Figure 6:
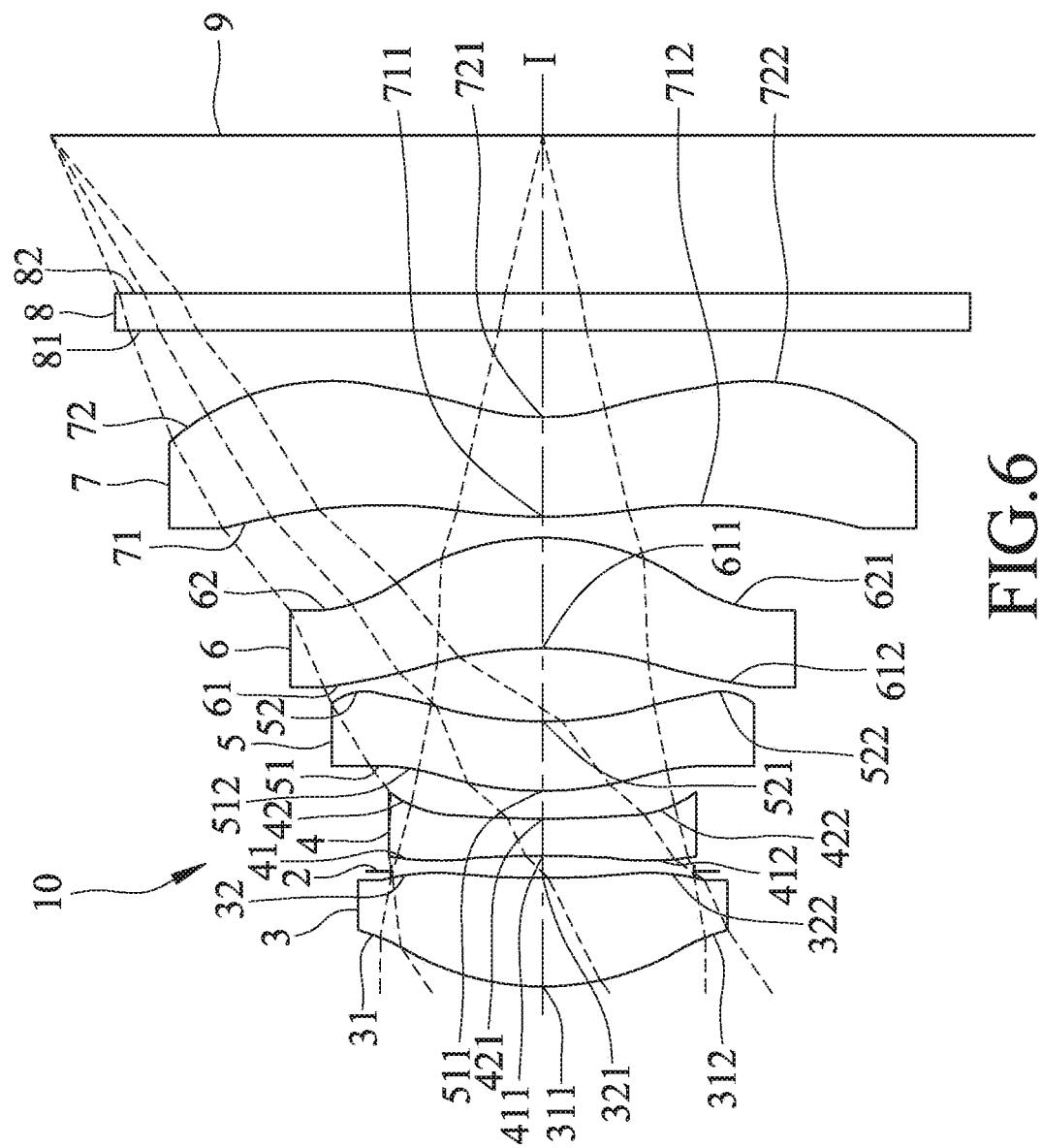
FIG. 6 is a schematic diagram that illustrates the second preferred embodiment of an imaging lens according to the present invention.
Figure 9:
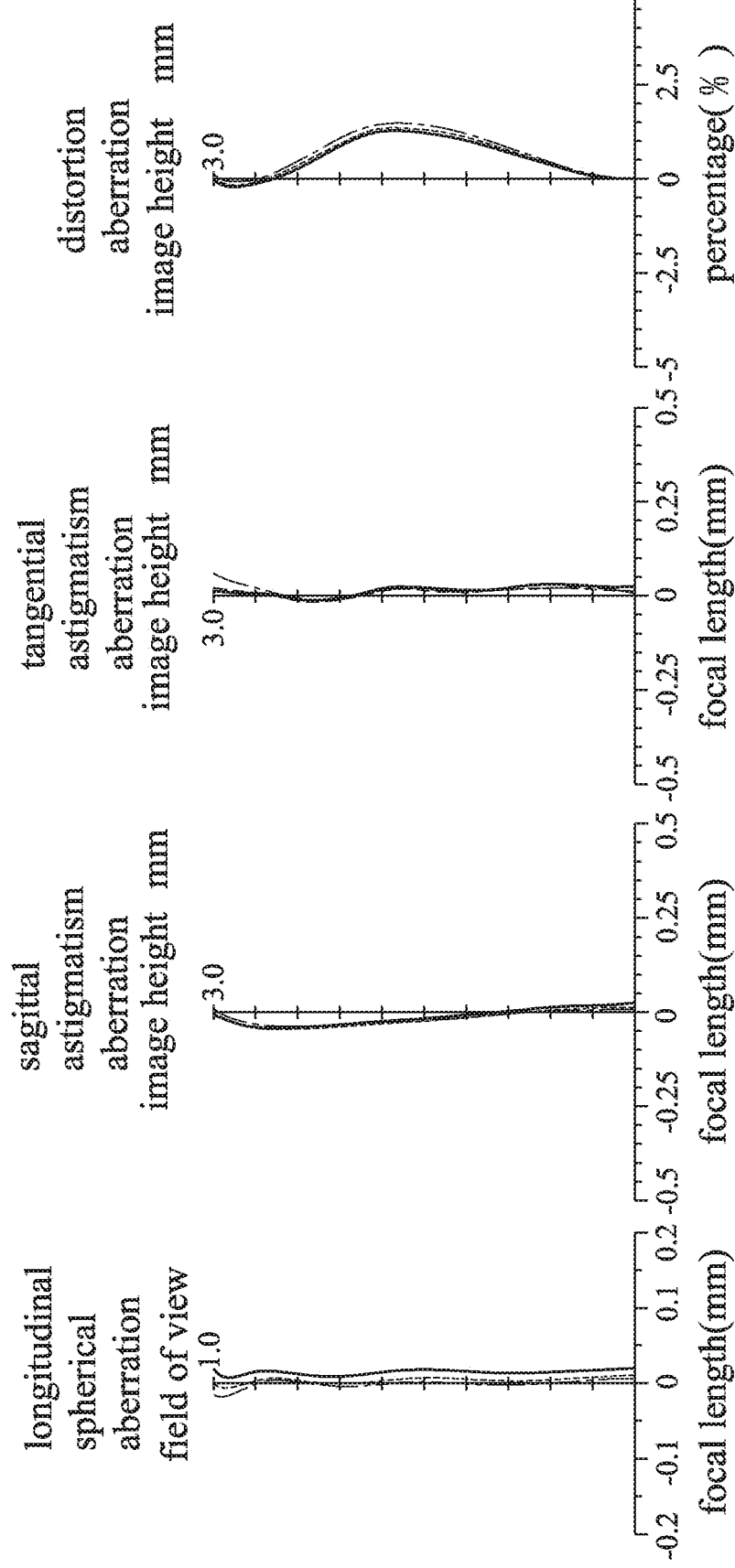
FIGS. 9(a) to 9(d) show different optical characteristics of the imaging lens of the second preferred embodiment.

Referring to FIG. 6, the differences between the first and second preferred embodiments of the imaging lens 10 of this invention reside in that: the image-side surface 62 of the fourth lens element 6 has a concave portion 621 in a vicinity of a periphery of the fourth lens element 6.

Shown in FIG. 7 is a table that lists values of some optical data corresponding to the surfaces 31-81, 32-82 of the second preferred embodiment. The imaging lens 10 has an overall system focal length of 4.014 mm, an HFOV of 36.777°, an F-number of 2.038, and a system length of 4.949 mm.

Shown in FIG. 8 is a table that lists values of some aspherical coefficients of the aforementioned relationship (1) corresponding to the second preferred embodiment.

Relationships among some of the aforementioned lens parameters corresponding to the second preferred embodiment are as follows:

$TTL=4.949$; $ALT=2.480$; $Gaa=0.835$;

$TTL/G45=41.244$; $TTL/T2=23.568$;

$Gaa/T1=1.305$; $ALT/G45=20.667$;

$ALT/Gaa=2.970$; $Gaa/T3=2.088$;

$ALT/G34=5.976$; $Gaa/G23=4.912$;

$Gaa/G34=2.012$; $TTL/T4=7.614$;

$TTL/Gaa=5.927$; $TTL/ALT=1.996$;

and $ALT/T1=3.875$.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
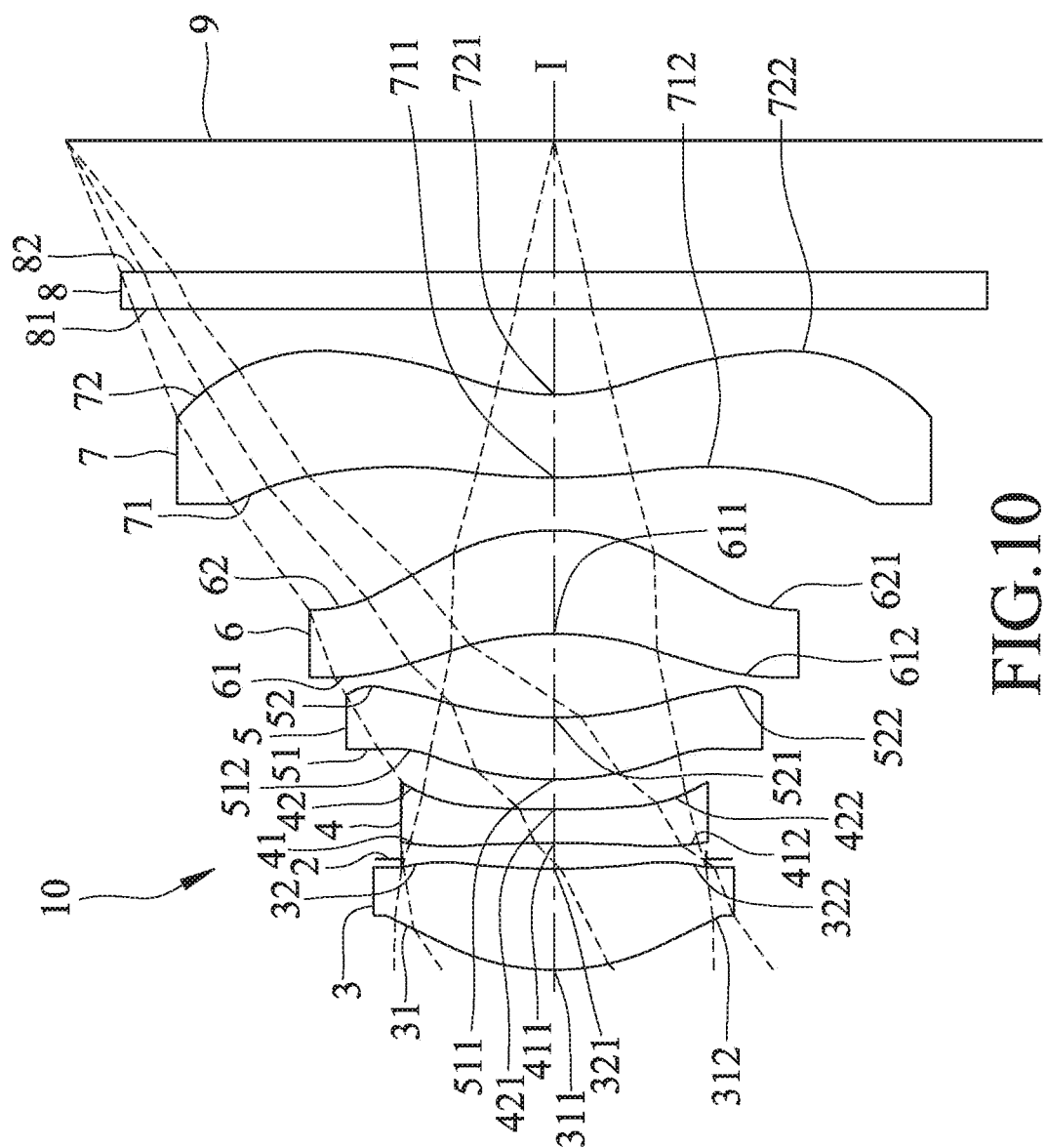
FIG. 10 is a schematic diagram that illustrates the third preferred embodiment of an imaging lens according to the present invention.
Figure 13:
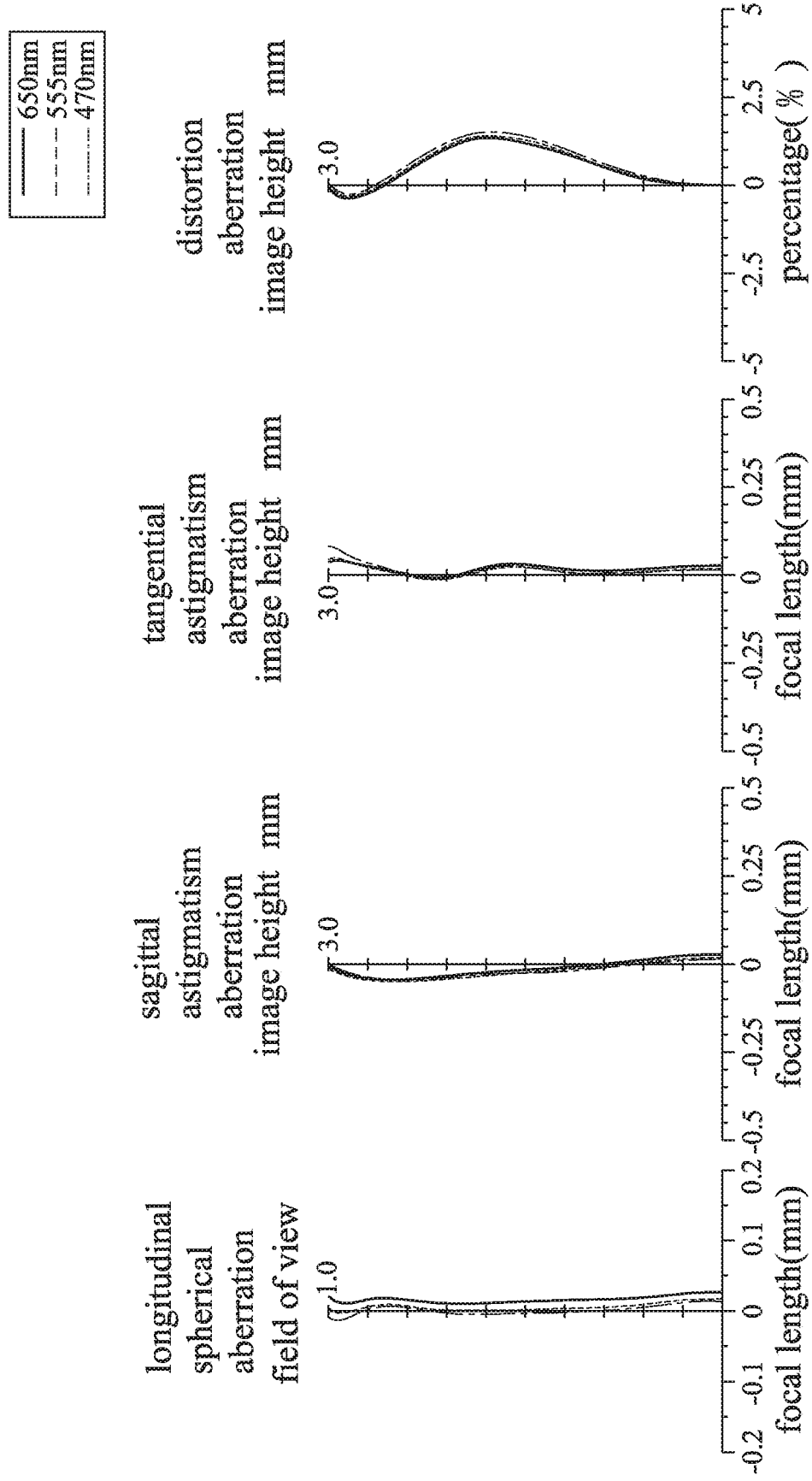
FIGS. 13(a) to 13(d) show different optical characteristics of the imaging lens of the third preferred embodiment.

Referring to FIG. 10, the differences between the first and third preferred embodiments of the imaging lens 10 of this invention reside in that: the image-side surface 62 of the fourth lens element 6 has a concave portion 621 in a vicinity of a periphery of the fourth lens element 6.

Shown in FIG. 11 is a table that lists values of some optical data corresponding to the surfaces 31-81, 32-82 of the third preferred embodiment. The imaging lens 10 has an overall system focal length of 4.003 mm, an HFOV of 36.85°, an F-number of 2.038, and a system length of 4.856 mm.

Shown in FIG. 12 is a table that lists values of some aspherical coefficients of the aforementioned relationship (1) corresponding to the third preferred embodiment.

Relationships among some of the aforementioned lens parameters corresponding to the third preferred embodiment are as follows:

$TTL=4.856$; $ALT=2.275$; $Gaa=1.095$;

$TTL/G45=16.186$; $TTL/T2=24.279$;

$Gaa/T1=1.825$; $ALT/G45=7.583$;

$ALT/Gaa=2.078$; $Gaa/T3=3.000$;

$ALT/G34=4.740$; $Gaa/G23=6.441$;

$Gaa/G34=2.281$; $TTL/T4=7.832$;

$TTL/Gaa=4.435$; $TTL/ALT=2.134$;

and $ALT/T1=3.792$.

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

Figure 14:
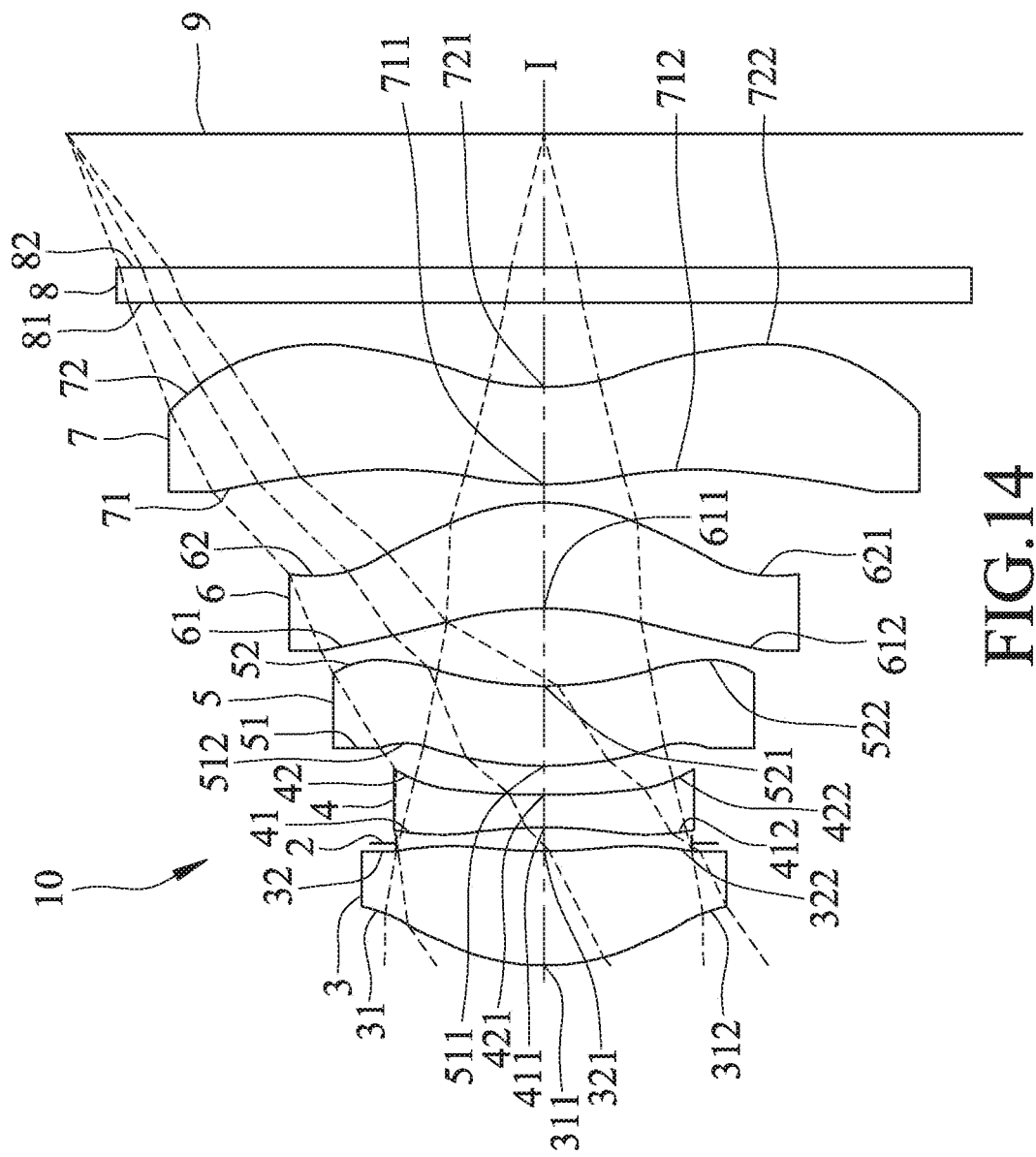
FIG. 14 is a schematic diagram that illustrates the fourth preferred embodiment of an imaging lens according to the present invention.
Figure 17:
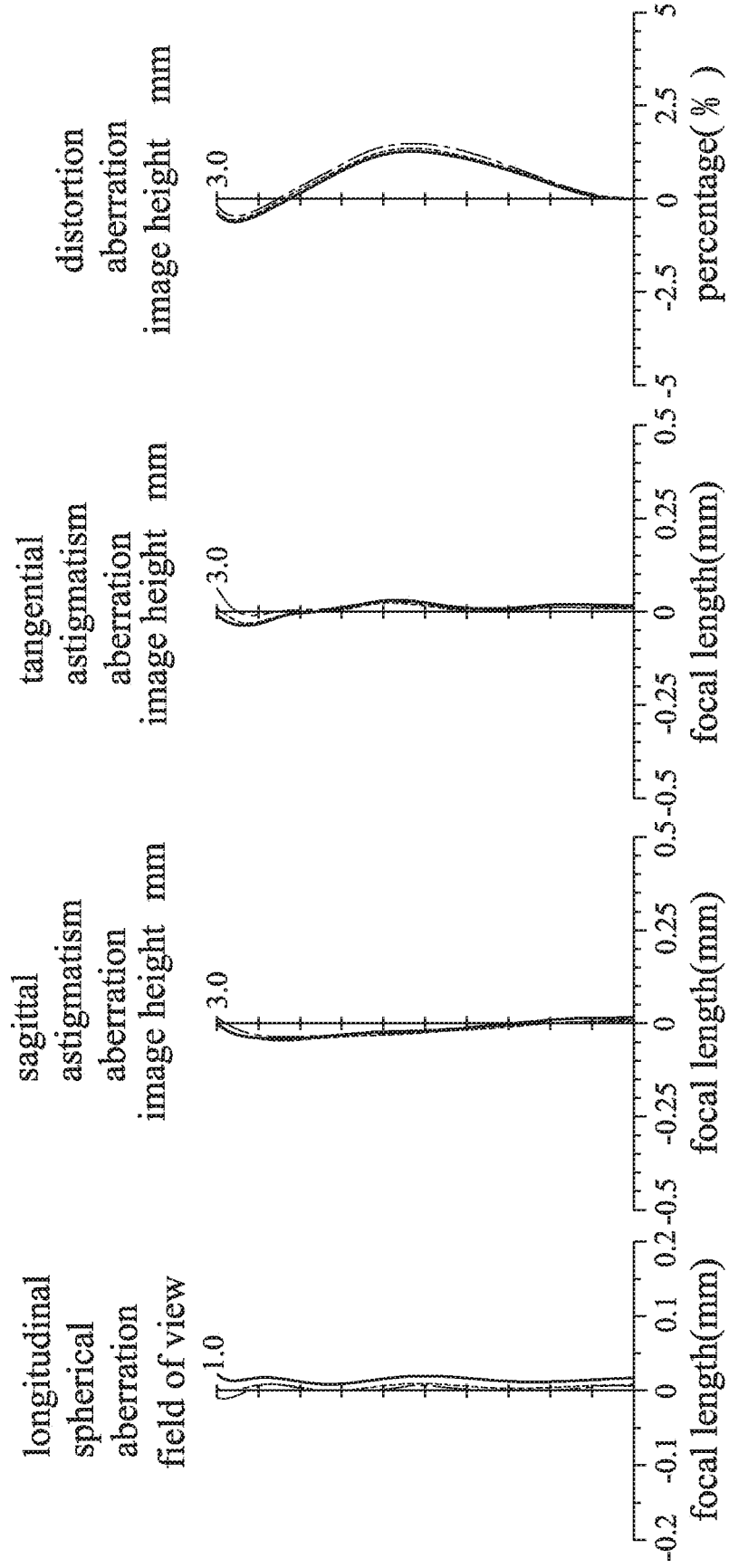
FIGS. 17(a) to 17(d) show different optical characteristics of the imaging lens of the fourth preferred embodiment.

Referring to FIG. 14, the differences between the first and fourth preferred embodiments of the imaging lens 10 of this invention reside in that: the image-side surface 62 of the fourth lens element 6 has a concave portion 621 in a vicinity of a periphery of the fourth lens element 6.

Shown in FIG. 15 is a table that lists values of some optical data corresponding to the surfaces 31-81, 32-82 of the fourth preferred embodiment. The imaging lens 10 has an overall system focal length of 4.016 mm, an HFOV of 36.761°, an F-number of 2.018, and a system length of 4.976 mm.

Shown in FIG. 16 is a table that lists values of some aspherical coefficients of the aforementioned relationship (1) corresponding to the fourth preferred embodiment.

Relationships among some of the aforementioned lens parameters corresponding to the fourth preferred embodiment are as follows:

$TTL=4.976$; $ALT=2.610$; $Gaa=0.860$;

$TTL/G45=41.464$; $TTL/T2=23.694$;

$Gaa/T1=1.265$; $ALT/G45=21.750$;

$ALT/Gaa=3.035$; $Gaa/T3=1.755$;

$ALT/G34=5.932$; $Gaa/G23=5.059$;

$Gaa/G34=1.955$; $TTL/T4=7.655$;

$TTL/Gaa=5.786$; $TTL/ALT=1.906$;

and $ALT/T1=3.838$.

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
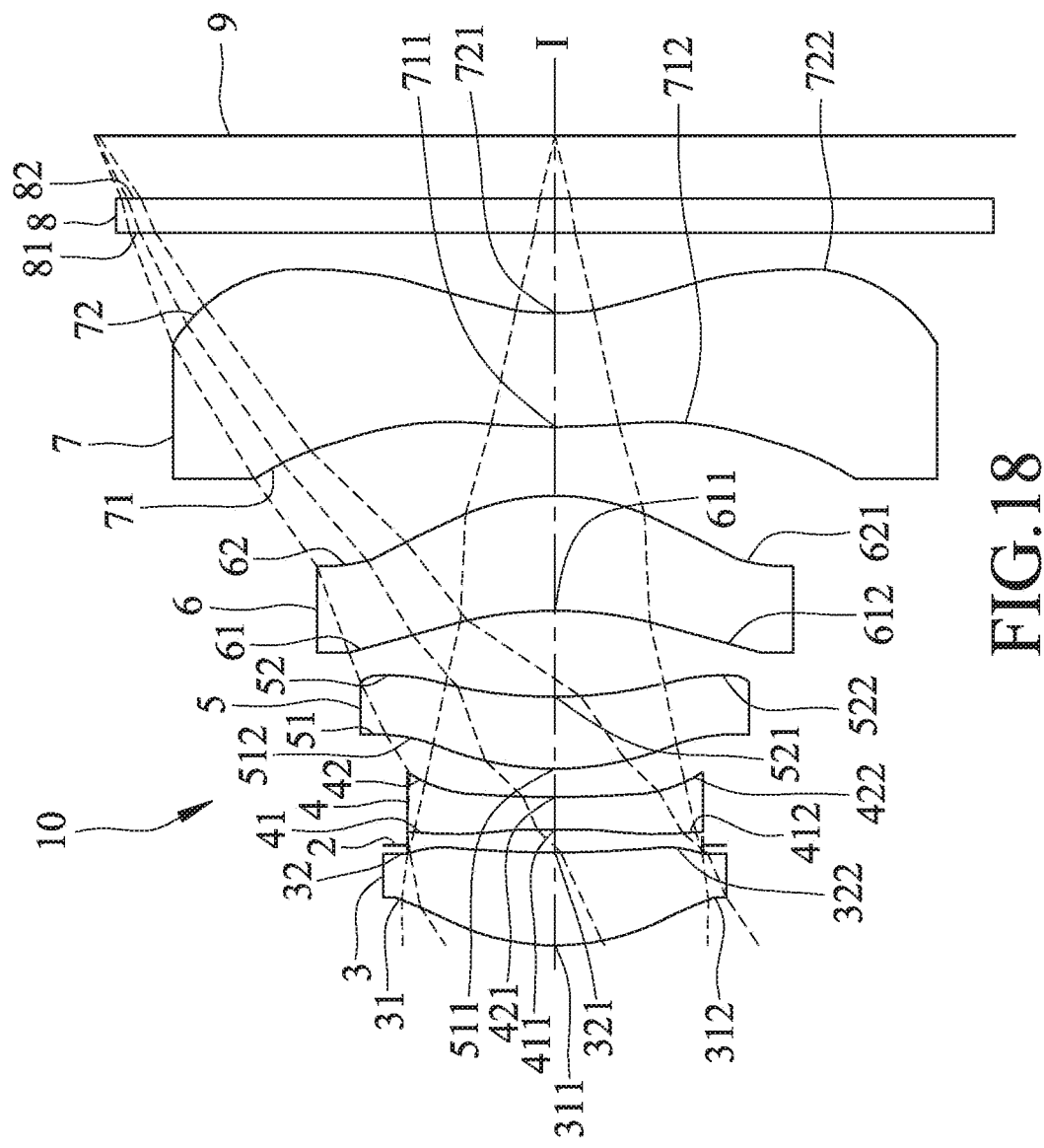
FIG. 18 is a schematic diagram that illustrates the fifth preferred embodiment of an imaging lens according to the present invention.
Figures 21A, 21B, 21C, 21D:
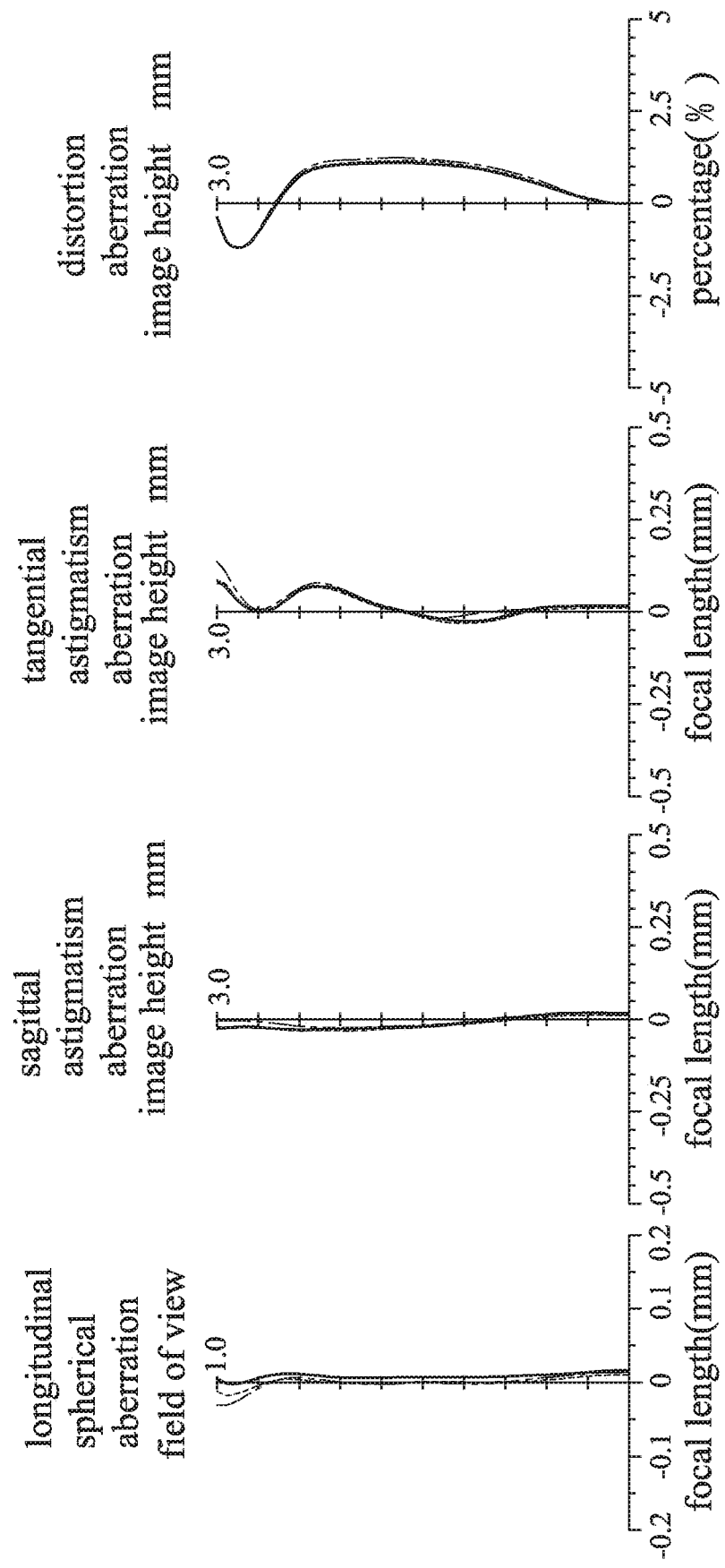
FIGS. 21(a) to 21(d) show different optical characteristics of the imaging lens of the fifth preferred embodiment.

Referring to FIG. 18, the differences between the first and fifth preferred embodiments of the imaging lens 10 of this invention reside in that: the image-side surface 62 of the fourth lens element 6 has a concave portion 621 in a vicinity of a periphery of the fourth lens element 6.

Shown in FIG. 19 is a table that lists values of some optical data corresponding to the surfaces 31-81, 32-82 of the fifth preferred embodiment. The imaging lens 10 has an overall system focal length of 4.086 mm, an HFOV of 36.285°, an F-number of 2.055, and a system length of 5.007 mm.

Shown in FIG. 20 is a table that lists values of some aspherical coefficients of the aforementioned relationship (1) corresponding to the fifth preferred embodiment.

Relationships among some of the aforementioned lens parameters corresponding to the fifth preferred embodiment are as follows:

$TTL=5.007$; $ALT=2.610$; $Gaa=1.295$;

$TTL/G45=11.380$; $TTL/T2=25.036$;

$Gaa/T1=2.272$; $ALT/G45=5.932$;

$ALT/Gaa=2.015$; $Gaa/T3=2.943$;

$ALT/G34=4.833$; $Gaa/G23=7.618$;

$Gaa/G34=2.398$; $TTL/T4=7.153$;

$TTL/Gaa=3.867$; $TTL/ALT=1.918$;

and $ALT/T1=4.579$.

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) to 21(d) that the fifth preferred embodiment is able to achieve a relatively good optical performance.

Figure 22:
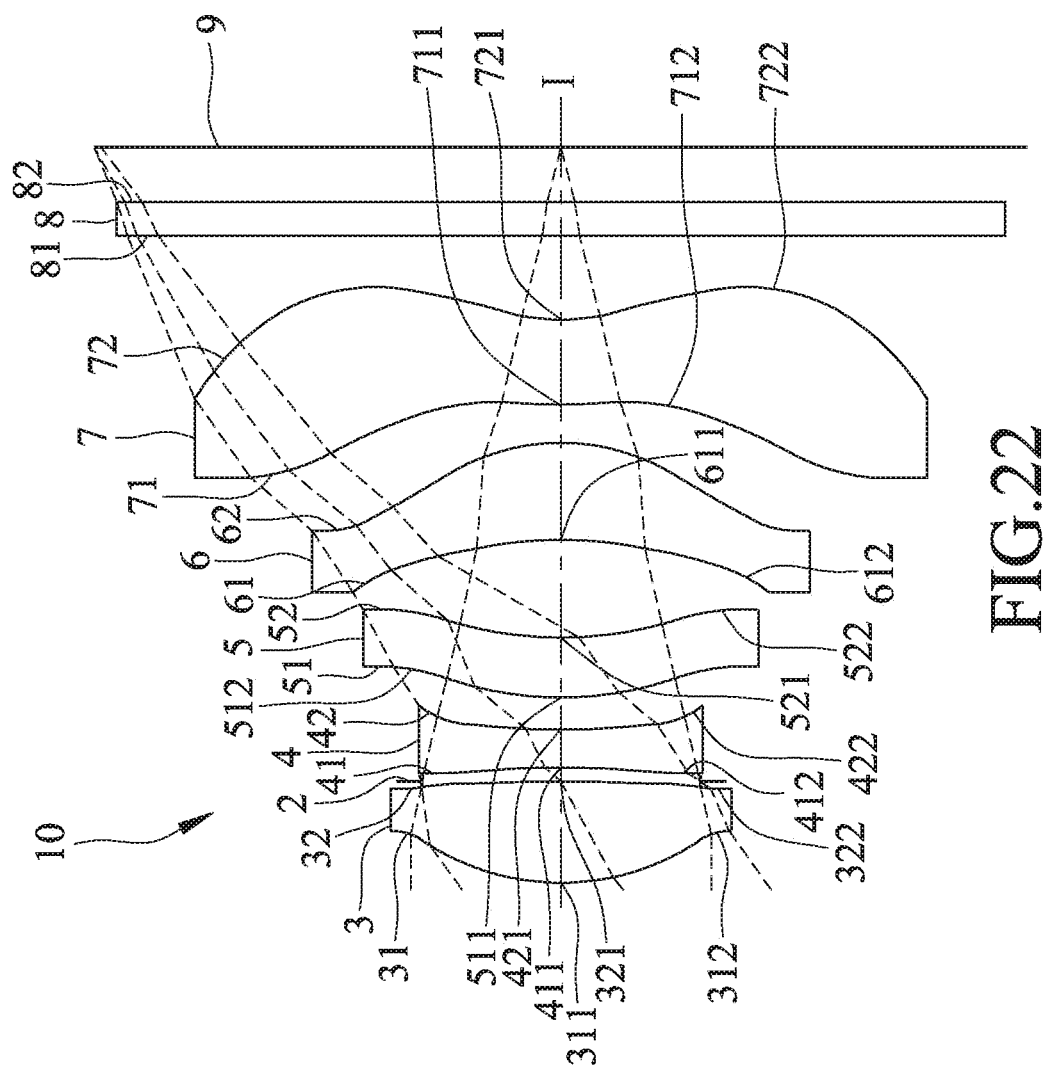
FIG. 22 is a schematic diagram that illustrates the sixth preferred embodiment of an imaging lens according to the present invention.
Figure 25:
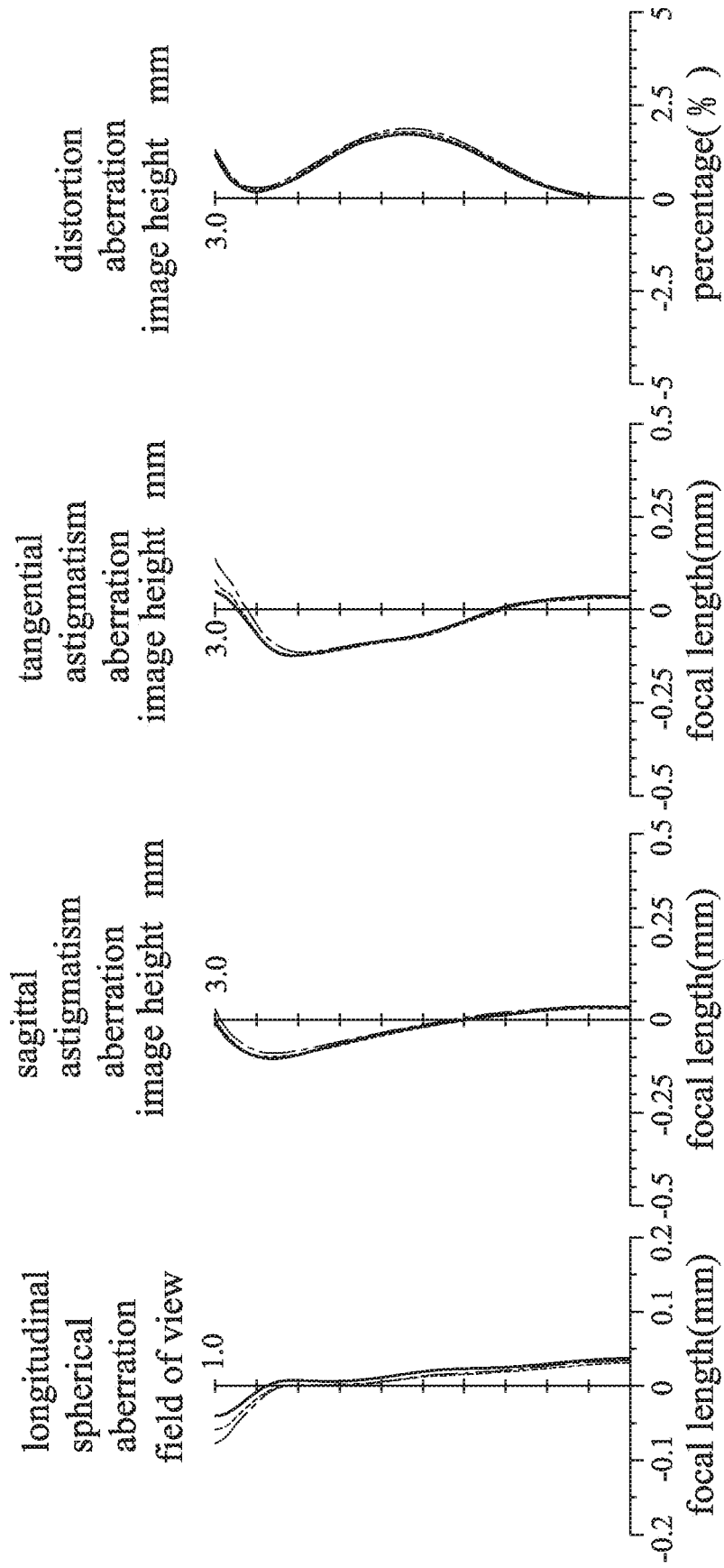
FIGS. 25(a) to 25(d) show different optical characteristics of the imaging lens of the sixth preferred embodiment.

FIG. 22 illustrates the sixth preferred embodiment of an imaging lens 10 according to the present invention, which has a configuration similar to that of the first preferred embodiment.

Shown in FIG. 23 is a table that lists values of some optical data corresponding to the surfaces 31-81, 32-82 of the sixth preferred embodiment. The imaging lens 10 has an overall system focal length of 3.804 mm, an HFOV of 38.28°, an F-number of 1.933, and a system length of 4.513 mm.

Shown in FIG. 24 is a table that lists values of some aspherical coefficients of the aforementioned relationship (1) corresponding to the sixth preferred embodiment.

Relationships among some of the aforementioned lens parameters corresponding to the sixth preferred embodiment are as follows:

$TTL=4.513$; $ALT=2.346$; $Gaa=1.124$;

$TTL/G45=17.719$; $TTL/T2=18.777$;

$Gaa/T1=1.826$; $ALT/G45=9.210$;

$ALT/Gaa=2.087$; $Gaa/T3=2.981$;

$ALT/G34=3.971$; $Gaa/G23=6.501$;

$Gaa/G34=1.903$; $TTL/T4=7.581$;

$TTL/Gaa=4.015$; $TTL/ALT=1.924$;

and $ALT/T1=3.810$.

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

Figure 26:
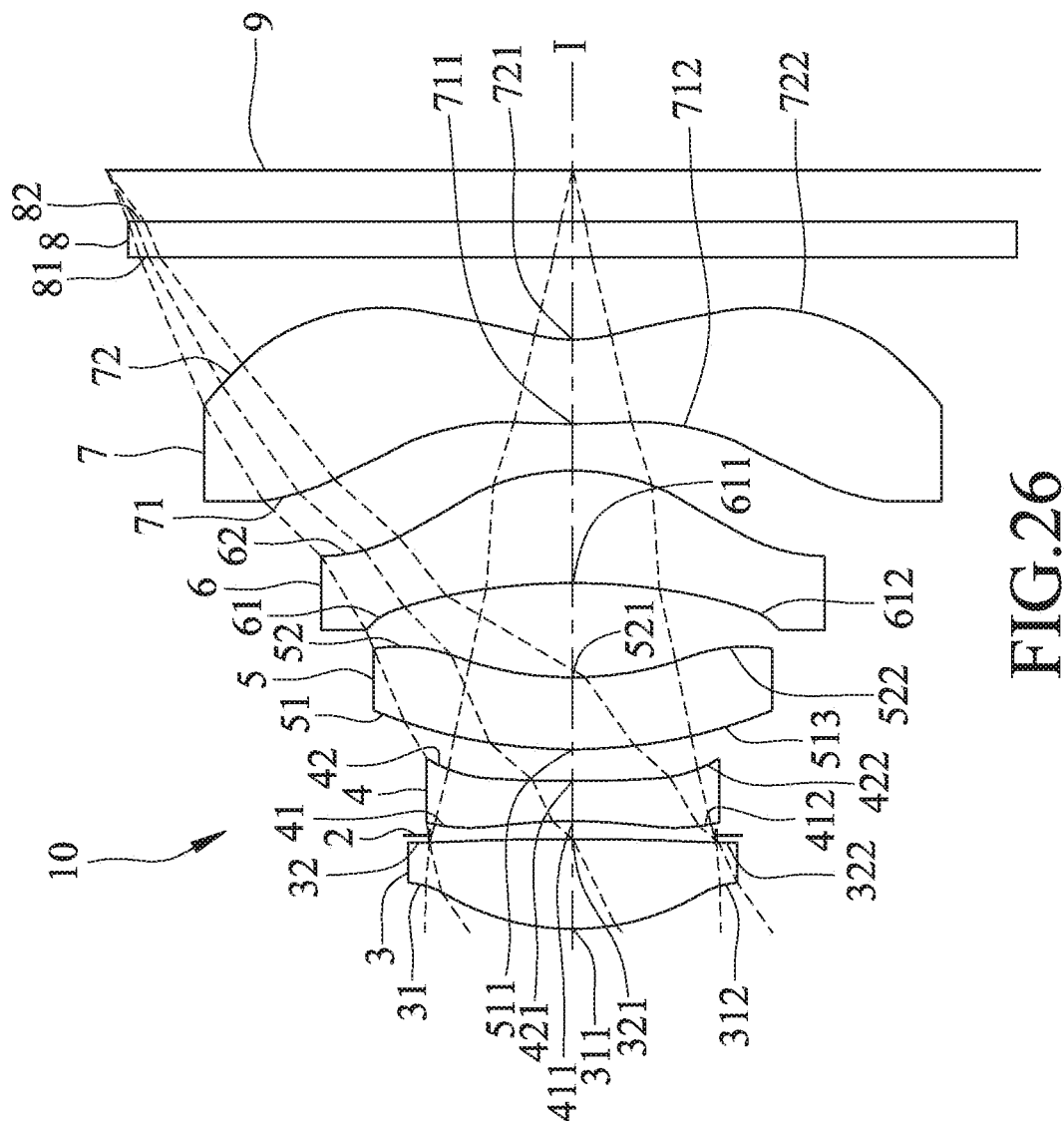
FIG. 26 is a schematic diagram that illustrates the seventh preferred embodiment of an imaging lens according to the present invention.
Figure 29:
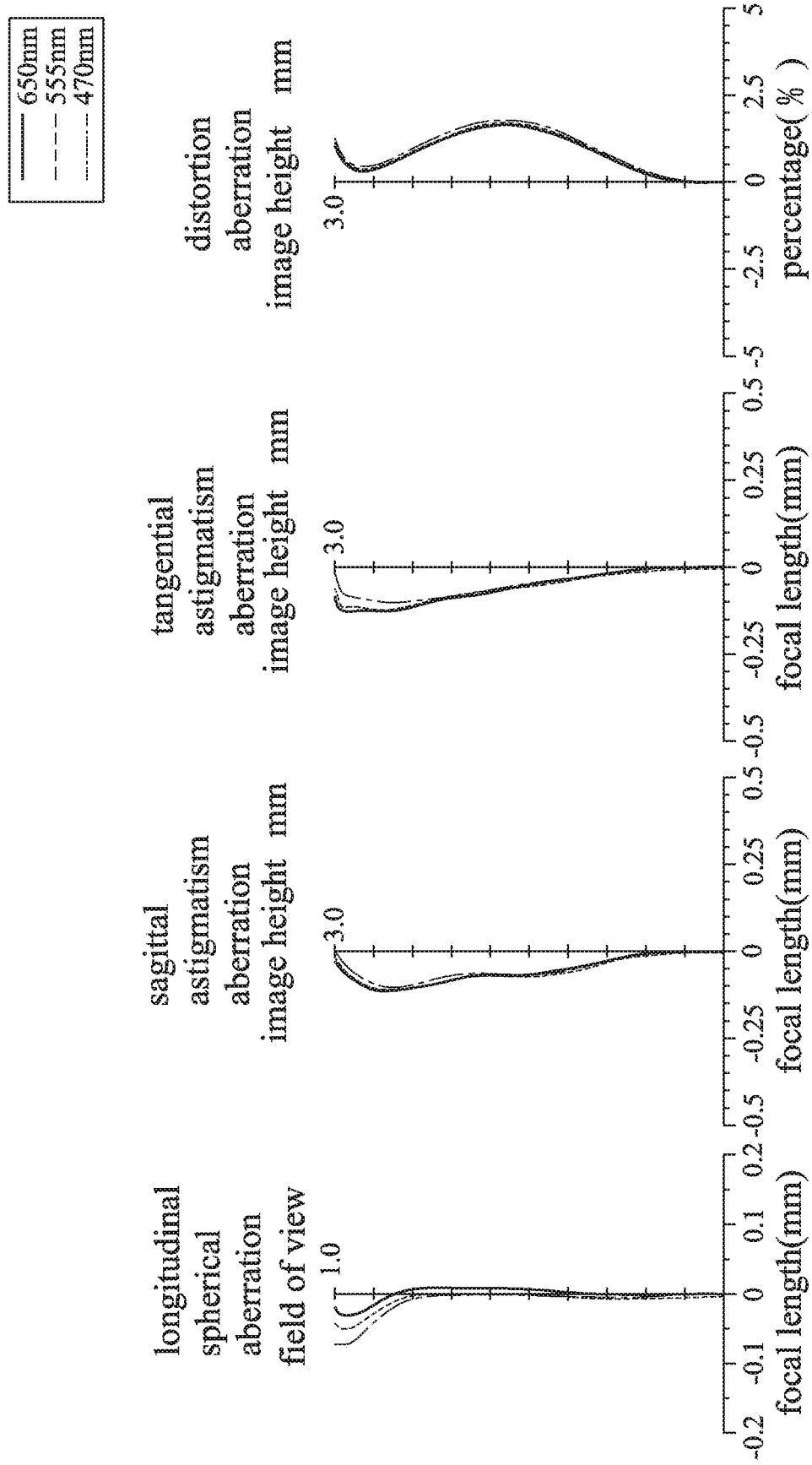
FIGS. 29(a) to 29(d) show different optical characteristics of the imaging lens of the seventh preferred embodiment.

Referring to FIG. 26, the differences between the first and seventh preferred embodiments of the imaging lens 10 of this invention reside in that: the object-side surface 51 of the third lens element 5 has a convex portion 511 in a vicinity of the optical axis (I) and a convex portion 513 in a vicinity of a periphery of the third lens element 5.

Shown in FIG. 27 is a table that lists values of some optical data corresponding to the surfaces 31-81, 32-82 of the seventh preferred embodiment. The imaging lens 10 has an overall system focal length of 3.734 mm, an HFOV of 38.461°, an F-number of 1.949, and a system length of 4.630 mm.

Shown in FIG. 28 is a table that lists values of some aspherical coefficients of the aforementioned relationship (1) corresponding to the seventh preferred embodiment.

Relationships among some of the aforementioned lens parameters corresponding to the seventh preferred embodiment are as follows:

$TTL=4.630$; $ALT=2.409$; $Gaa=1.196$;

$TTL/G45=15.143$; $TTL/T2=18.285$;

$Gaa/T1=2.235$; $ALT/G45=7.879$;

$ALT/Gaa=2.015$; $Gaa/T3=2.758$;

$ALT/G34=4.171$; $Gaa/G23=6.208$;

$Gaa/G34=2.070$; $TTL/T4=6.876$;

$TTL/Gaa=3.873$; $TTL/ALT=1.922$;

and $ALT/T1=4.503$.

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Shown in FIG. 30 is a table that lists the aforethe relationships among some of the aforementioned lens parameters corresponding to the seven preferred embodiments for comparison. It should be noted that the values of the lens parameters and the relationships listed in FIG. 30 are rounded off to the third decimal place. When each of the lens parameters of the imaging lens 10 according to this invention satisfies the following optical relationships, the optical performance is still relatively good even with the reduced system length:

(1) $TTL/G45 \leq 46.0$: In comparison with TTL, G45 has a relatively small reducible ratio. In consideration of optical properties and manufacturing ability, better arrangement may be achieved when this relationship is satisfied. Preferably, $10.0 \leq TTL/G45 \leq 46.0$.

(2) $TTL/T2 \leq 19.0$: In comparison with TTL, T2 has a relatively small reducible ratio. In consideration of optical properties and manufacturing ability, better arrangement may be achieved when this relationship is satisfied. Preferably, $17.0 \leq TTL/T2 \leq 19.0$.

(3) $Gaa/T1 \leq 2.3$: In general, since the first lens element 3 is provided with the positive refractive power, the first lens element 3 is relatively thick and the reducible ratio of T1 is relatively small. When Gaa/T1 is smaller than 2.3, reduction of Gaa is relatively large, so that the overall system length of the imaging lens 10 may be reduced. Better optical quality may be achieved when this relationship is satisfied. Preferably, $1.0 \leq Gaa/T1 \leq 2.3$.

(4) $ALT/G45 \leq 26.0$: In comparison with ALT, G45 has a relatively small reducible ratio so that an appropriate distance may be maintained between the fourth lens element 6 and the fifth lens element 7 to enhance image quality. Preferably, $5.0 \leq ALT/G45 \leq 26.0$.

(5) $ALT/Gaa \geq 2.0$: In comparison with ALT, Gaa has a relatively large reducible ratio. In consideration of optical properties and manufacturing ability, better arrangement may be achieved when this relationship is satisfied. Preferably, $2.0 \leq ALT/Gaa \leq 4.0$.

(6) $Gaa/T3 \leq 3.0$: In comparison with Gaa, T3 has a relatively small reducible ratio. In consideration of optical properties and manufacturing ability, better arrangement may be achieved when this relationship is satisfied. Preferably, $1.0 \leq Gaa/T3 \leq 3.0$.

(7) $ALT/G34 \leq 6.0$: In comparison with ALT, G34 has a relatively small reducible ratio so that an appropriate distance may be maintained between the third lens element 5 and the fourth lens element 6 to enhance image quality. In consideration of optical properties and manufacturing ability, better arrangement may be achieved when this relationship is satisfied. Preferably, $3.0 \leq ALT/G34 \leq 6.0$.

(8) $Gaa/G23 \leq 6.0$: In comparison with Gaa, G23 has a relatively small reducible ratio so that an appropriate distance may be maintained between the second lens element 4 and the third lens element 5 to enhance image quality. In consideration of optical properties and manufacturing ability, better arrangement may be achieved when this relationship is satisfied. Preferably, $4.0 \leq Gaa/G23 \leq 6.0$.

(9) $Gaa/G34 \leq 2.5$: In comparison with Gaa, G34 has a relatively small reducible ratio so that an appropriate distance may be maintained between the third lens element 5 and the fourth lens element 6 to enhance image quality. In consideration of optical properties and manufacturing ability, better arrangement may be achieved when this relationship is satisfied. Preferably, $1.0 \leq Gaa/G34 \leq 2.5$.

(10) $TTL/T4 \leq 8.0$: In comparison with TTL, T4 has a relatively small reducible ratio. In consideration of optical properties and manufacturing ability, better arrangement may be achieved when this relationship is satisfied. Preferably, $6.0 \leq TTL/T4 \leq 8.0$.

(11) $TTL/Gaa \geq 4.0$: In comparison with TTL, Gaa has a relatively large reducible ratio. In consideration of optical properties and manufacturing ability, better arrangement may be achieved when this relationship is satisfied. Preferably, $4.0 \leq TTL/Gaa \leq 7.0$.

(12) $TTL/ALT \geq 1.8$: In comparison with TTL, ALT has a relatively large reducible ratio. In consideration of optical properties and manufacturing ability, better arrangement may be achieved when this relationship is satisfied. Preferably, $1.8 \leq TTL/ALT \leq 3.0$.

(13) $ALT/T1 \leq 4.0$: In general, since the first lens element 3 is provided with the positive refractive power, the first lens element 3 is relatively thick and the reducible ratio of T1 is relatively small. When ALT/T1 is smaller than 4.0, reduction of ALT is relatively large, so that the overall system length of the imaging lens 10 may be reduced. Better optical quality may be achieved when this relationship is satisfied. Preferably, $3.0 \leq ALT/T1 \leq 4.0$.

To sum up, effects and advantages of the imaging lens 10 according to the present invention are described hereinafter.

For each of the seven preferred embodiments of this invention, the longitudinal spherical, astigmatism and distortion aberrations respectively fall within the range of ±0.03 mm, the range of ±0.2 mm and the range of ±2%. The off-axis rays corresponding respectively to wavelengths of 470 nm (blue ray), 555 nm (green ray), and 650 nm (red ray) are around the imaging point. It is evident from the deviation range of each of the curves that deviations of the imaging points of the off-axis rays with different heights are well controlled so that the imaging lens 10 has good performance in terms of spherical aberration, astigmatism aberration and distortion aberration at each of the wavelengths. Furthermore, since the curves with different wavelengths that respectively represent red, green, and blue rays are close to each other, the imaging lens 10 has a relatively low chromatic aberration. As a result, by virtue of the abovementioned design of the lens elements, good image quality may be achieved.

In addition, in each of the aforethe seven preferred embodiments, the system length of this invention is smaller than 5.1 mm. As a result, not only can this invention have good optical performance, but the system length of this invention can also be shortened to achieve a goal of miniaturization.

Figure 31:
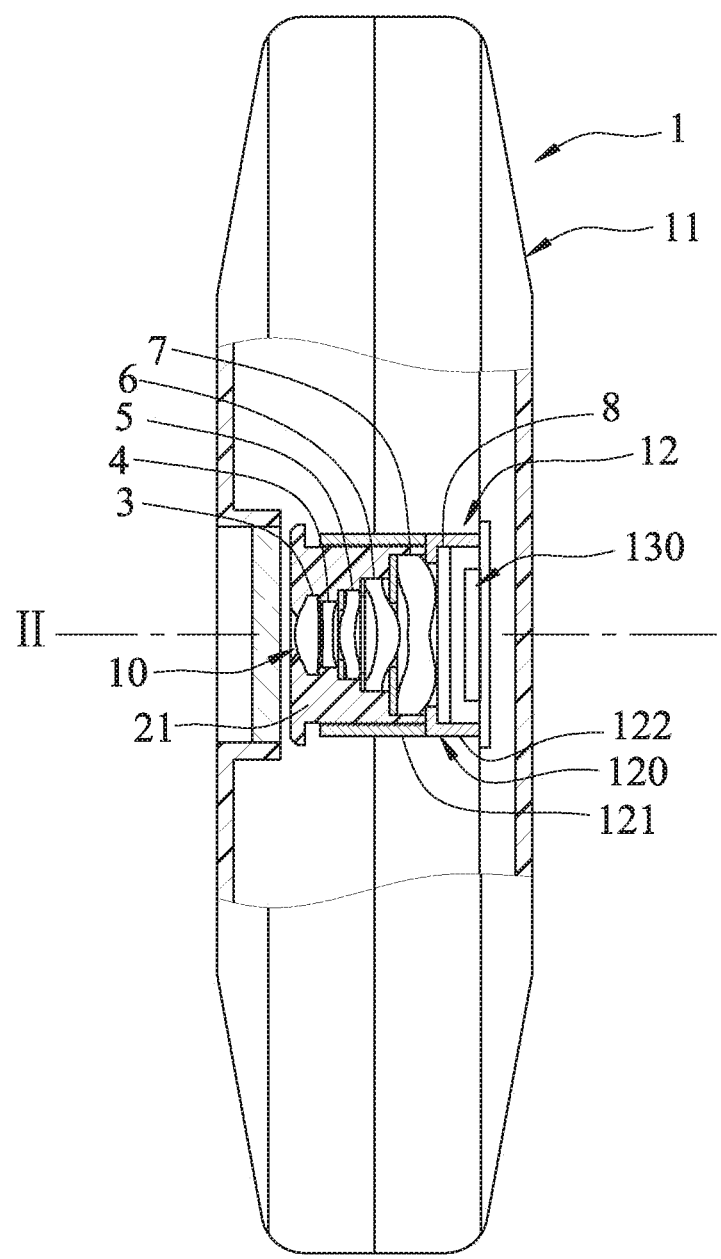
FIG. 31 is a schematic partly sectional view to illustrate a first exemplary application of the imaging lens of the present invention.

Shown in FIG. 31 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1.

The imaging module 12 includes a barrel 21 on which the imaging lens 10 is disposed, a holder unit 120 on which the barrel 21 is disposed, and an image sensor 130 disposed at the image plane 9 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 32:
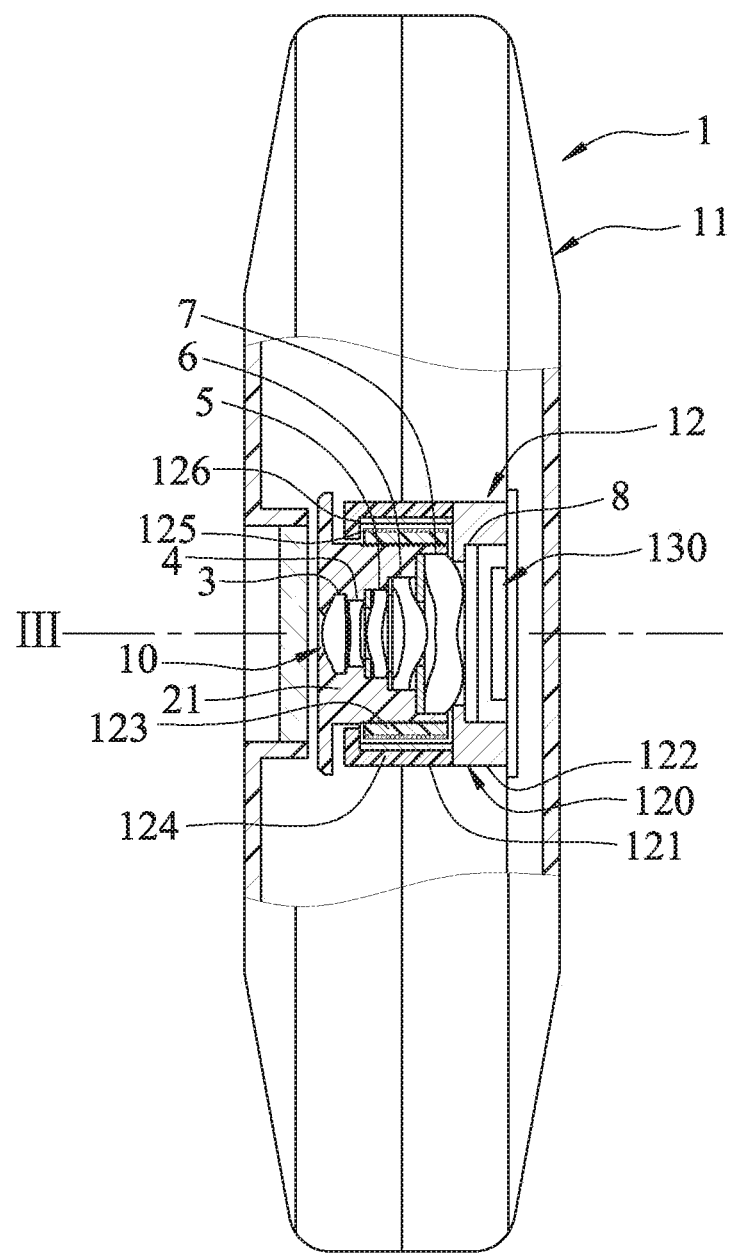
FIG. 32 is a schematic partly sectional view to illustrate a second exemplary application of the imaging lens of the present invention.

Shown in FIG. 32 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element, and a fifth lens element arranged in order from an object side to an image side along an optical axis of the imaging lens, each of the first lens element, the second lens element, the third lens element, the fourth lens element and the fifth lens element having an object-side surface facing toward the object side, and an image-side surface facing toward the image side, wherein:
   the object-side surface of the second lens element has a concave portion in a vicinity of the optical axis and a convex portion in a periphery of the second lens element;
   the image-side surface of the third lens element has a concave portion in a vicinity of the optical axis of the third lens element;
   the fourth lens element has a positive refractive power;
   the object-side surface of the fifth lens element has a concave portion in a vicinity of a periphery of the fifth lens element; and
   the imaging lens does not include any lens element with refractive power other than the first lens element, the second lens element, the third lens element, the fourth lens element, and the fifth lens element.

2. The imaging lens of claim 1, further satisfying $4.772 \leq (T1+T4)/T2 \leq 6.350$, where T1 represents a thickness of the first lens element at the optical axis, T4 represents a thickness of the fourth lens element at the optical axis, and T2 represents a thickness of the second lens element at the optical axis.

3. The imaging lens of claim 1, further satisfying $8.414 \leq (T1+T4)/G12 \leq 11.447$, where T1 represents a thickness of the first lens element at the optical axis, T4 represents a thickness of the fourth lens element at the optical axis, and G12 represents an air gap length between the first lens element and the second lens element at the optical axis.

4. The imaging lens of claim 1, further satisfying $4.722 \leq (T2+T3+T5)/T2 \leq 6.700$, where T2 represents a thickness of the second lens element at the optical axis, T3 represents a thickness of the third lens element at the optical axis, T5 represents a thickness of the fifth lens element at the optical axis, and T2 represents a thickness of the second lens element at the optical axis.

5. The imaging lens of claim 1, further satisfying $6.206 \leq (T2+T3+T5)/G23 \leq 7.882$, where T2 represents a thickness of the second lens element at the optical axis, T3 represents a thickness of the third lens element at the optical axis, T5 represents a thickness of the fifth lens element at the optical axis, and G23 represents an air gap length between the second lens element and the third lens element at the optical axis.

6. The imaging lens of claim 1, further satisfying $10.155 \leq TTL/T3 \leq 13.303$, where TTL represents a distance at the optical axis between the object-side surface of the first lens element and an image plane at the image side, and T3 represents a thickness of the third lens element at the optical axis.

7. The imaging lens of claim 1, further satisfying $7.154 \leq TTL/T5 \leq 9.909$, where TTL represents a distance at the optical axis between the object-side surface of the first lens element and an image plane at the image side, and T5 represents a thickness of the fifth lens element at the optical axis.

8. The imaging lens of claim 1, further satisfying $7.640 \leq TTL/G34 \leq 11.925$, where TTL represents a distance at the optical axis between the object-side surface of the first lens element and an image plane at the image side, and G34 represents an air gap length between the third lens element and the fourth lens element at the optical axis.

9. The imaging lens of claim 1, further satisfying $8.209 \leq TTL/(G23+G45) \leq 17.728$, where TTL represents a distance at the optical axis between the object-side surface of the first lens element and an image plane at the image side, G23 represents an air gap length between the second lens element and the third lens element at the optical axis, and G45 represents an air gap length between the fourth lens element and the fifth lens element at the optical axis.

10. The imaging lens of claim 1, further satisfying $5.273 \leq TTL/(T1+T2) \leq 6.502$, where TTL represents a distance at the optical axis between the object-side surface of the first lens element and an image plane at the image side, T1 represents a thickness of the first lens element at the optical axis, and T2 represents a thickness of the second lens element at the optical axis.

11. The imaging lens of claim 1, further satisfying $5.540 \leq EFL/T4 \leq 6.576$, where EFL represents an overall system effective focal length, and T4 represents a thickness of the fourth lens element at the optical axis.

12. The imaging lens of claim 1, further satisfying $4.174 \leq EFL/(G34+G45) \leq 7.495$, where EFL represents an overall system effective focal length, and G34 represents an air gap length between the third lens element and the fourth lens element at the optical axis, and G45 represents an air gap length between the fourth lens element and the fifth lens element at the optical axis.

13. The imaging lens of claim 1, further satisfying $5.432 \leq EFL/(T2+T3) \leq 7.079$, where EFL represents an overall system effective focal length, T2 represents a thickness of the second lens element at the optical axis and T3 represents a thickness of the third lens element at the optical axis.

14. The imaging lens of claim 1, further satisfying $4.462 \leq ALT/(G12+G45) \leq 10.609$, where ALT represents a sum of thicknesses of the first lens element, the second lens element, the third lens element, the fourth lens element and the fifth lens element at the optical axis, G12 represents an air gap length between the first lens element and the second lens element at the optical axis, and G45 represents an air gap length between the fourth lens element and the fifth lens element at the optical axis.

15. The imaging lens of claim 1, further satisfying $2.784 \leq Gaa/(G12+G23) \leq 4.111$, where Gaa represents a sum of four air gap lengths among the first lens element, the second lens element, the third lens element, the fourth lens element and the fifth lens element at the optical axis, G12 represents an air gap length between the first lens element and the second lens element at the optical axis, and G23 represents an air gap length between the second lens element and the third lens element at the optical axis.

16. The imaging lens of claim 1, further satisfying $1.265 \leq Gaa/T1 \leq 2.271$, where Gaa represents a sum of four air gap lengths among the first lens element, the second lens element, the third lens element, the fourth lens element and the fifth lens element at the optical axis, and T1 represents a thickness of the first lens element at the optical axis.

17. The imaging lens of claim 1, further satisfying $5.910 \leq TTL/(G23+G34) \leq 8.460$, where TTL represents a distance at the optical axis between the object-side surface of the first lens element and an image plane at the image side, G23 represents an air gap length between the second lens element and the third lens element at the optical axis, and G34 represents an air gap length between the third lens element and the fourth lens element at the optical axis.

18. The imaging lens of claim 1, further satisfying $2.664 \leq ALT/(G34+G45) \leq 4.660$, where ALT represents a sum of thicknesses of the first lens element, the second lens element, the third lens element, the fourth lens element and the fifth lens element at the optical axis, G34 represents an air gap length between the third lens element and the fourth lens element at the optical axis, and G45 represents an air gap length between the fourth lens element and the fifth lens element at the optical axis.

19. The imaging lens of claim 1, further satisfying $4.279 \leq ALT/(G23+G45) \leq 9.082$, where ALT represents a sum of thicknesses of the first lens element, the second lens element, the third lens element, the fourth lens element and the fifth lens element at the optical axis, G23 represents an air gap length between the second lens element and the third lens element at the optical axis, and G45 represents an air gap length between the fourth lens element and the fifth lens element at the optical axis.

20. The imaging lens of claim 1, further satisfying $1.591 \leq T4/G45 \leq 5.787$, where T4 represents a thickness of the fourth lens element at the optical axis, and G45 represents an air gap length between the fourth lens element and the fifth lens element at the optical axis.

* * * * *